US010067227B2

(12) United States Patent
Kamo et al.

(10) Patent No.: US 10,067,227 B2
(45) Date of Patent: Sep. 4, 2018

(54) NEURAL NETWORK-BASED RADAR SYSTEM

(71) Applicants: Nidec Corporation, Kyoto (JP); NATIONAL UNIVERSITY CORPORATION SHIZUOKA UNIVERSITY, Shizuoka-shi, Shizuoka (JP)

(72) Inventors: Hiroyuki Kamo, Kawasaki (JP); Yoshihiko Kuwahara, Hamamatsu (JP)

(73) Assignees: NIDEC CORPORATION, Kyoto (JP); NATIONAL UNIVERSITY CORPORATION SHIZUOKA UNIVERSIT, Shizuoka (JP)

(*) Notice: Subject to any disclaimer, the term of this patent is extended or adjusted under 35 U.S.C. 154(b) by 467 days.

(21) Appl. No.: 14/870,283

(22) Filed: Sep. 30, 2015

(65) Prior Publication Data
US 2016/0097853 A1 Apr. 7, 2016

(30) Foreign Application Priority Data

Oct. 6, 2014 (JP) .................... 2014-205609

(51) Int. Cl.
*G01S 7/41* (2006.01)
*G01S 13/93* (2006.01)
(Continued)

(52) U.S. Cl.
CPC ............. *G01S 13/931* (2013.01); *G01S 7/417* (2013.01); *G01S 13/345* (2013.01);
(Continued)

(58) Field of Classification Search
CPC ........ G01S 7/417; G01S 13/931; G01S 13/345; G01S 13/867; G01S 2013/9321; G06N 3/02
See application file for complete search history.

(56) References Cited

U.S. PATENT DOCUMENTS 3,368,202 A   2/1968  Crousel
5,345,539 A * 9/1994  Webb .................. G01S 7/417
                                                342/350
(Continued)

FOREIGN PATENT DOCUMENTS

JP        6-162396 A     6/1994
JP       06-308224 A    11/1994
(Continued)

OTHER PUBLICATIONS

Tsutsumi et al, "Identification of Parallel Running Vehicles by RBF Neural Network", AP-S 2015, IEEE, 2015, pp. 1548-1549.
(Continued)

*Primary Examiner* — Peter M Bythrow
(74) *Attorney, Agent, or Firm* — Keating & Bennett, LLP

(57) ABSTRACT

A radar system includes an array antenna including antenna elements that each output a reception signal in response to one or plural arriving waves, and a signal processing circuit in which a learned neural network has been established. The signal processing circuit receives the reception signals, inputs the reception signals or a secondary signal generated from the reception signals to the neural network, performs computation by using the reception signals or secondary signal and learned data of the neural network, and outputs a signal indicating the number of arriving waves from the neural network.

38 Claims, 17 Drawing Sheets

(51) Int. Cl.
*H01Q 1/32* (2006.01)
*G01S 13/34* (2006.01)
*G01S 13/86* (2006.01)
*G01S 13/58* (2006.01)
*G01S 13/02* (2006.01)
*G06N 3/02* (2006.01)

(52) U.S. Cl.
CPC .......... *G01S 13/584* (2013.01); *G01S 13/867* (2013.01); *H01Q 1/32* (2013.01); *G01S 13/0209* (2013.01); *G01S 2013/935* (2013.01); *G01S 2013/9321* (2013.01); *G01S 2013/9346* (2013.01); *G01S 2013/9367* (2013.01); *G06N 3/02* (2013.01)

(56) References Cited

U.S. PATENT DOCUMENTS

| | | | | |
|---|---|---|---|---|
| 5,613,039 | A * | 3/1997 | Wang | G01J 3/453 706/24 |
| 5,638,281 | A * | 6/1997 | Wang | G01J 3/453 701/301 |
| 5,768,477 | A | 6/1998 | Johnson et al. | |
| 6,366,236 | B1 * | 4/2002 | Farmer | G01S 7/417 342/118 |
| 7,474,252 | B2 * | 1/2009 | Natsume | G01S 3/74 342/379 |
| 7,535,408 | B2 * | 5/2009 | Kuhn | G01S 13/24 342/118 |
| 7,755,537 | B2 * | 7/2010 | Shimizu | G01S 7/4026 342/147 |
| 8,144,049 | B2 * | 3/2012 | Mizutani | G01S 3/74 342/147 |
| 8,179,303 | B2 * | 5/2012 | Kishida | G01S 13/42 342/107 |
| 8,441,395 | B2 * | 5/2013 | Kanamoto | G01S 3/74 342/107 |
| 8,730,099 | B2 * | 5/2014 | Kanamoto | G01S 3/74 342/147 |
| 8,812,226 | B2 * | 8/2014 | Zeng | G01S 13/723 382/103 |
| 8,820,782 | B2 | 9/2014 | Breed et al. | |
| 8,902,103 | B2 | 12/2014 | Kim et al. | |
| 8,982,669 | B2 | 3/2015 | Barthel et al. | |
| 9,151,692 | B2 | 10/2015 | Breed | |
| 9,435,884 | B2 * | 9/2016 | Inoue | G01S 13/28 |
| 2004/0066966 | A1 * | 4/2004 | Schneiderman | G06K 9/527 382/159 |
| 2006/0007036 | A1 * | 1/2006 | Natsume | G01S 3/74 342/70 |
| 2006/0238405 | A1 | 10/2006 | Wakayama et al. | |
| 2009/0040097 | A1 * | 2/2009 | Sakamoto | G01S 3/74 342/118 |
| 2010/0191391 | A1 * | 7/2010 | Zeng | G01S 13/723 701/1 |
| 2011/0181300 | A1 | 7/2011 | Bowring et al. | |
| 2014/0225763 | A1 | 8/2014 | Kavaler et al. | |
| 2014/0297172 | A1 | 10/2014 | Huelsen | |
| 2016/0097853 | A1 * | 4/2016 | Kamo | G01S 13/345 342/70 |
| 2016/0223651 | A1 * | 8/2016 | Kamo | G01S 7/417 |

FOREIGN PATENT DOCUMENTS

| | | |
|---|---|---|
| JP | 2004-108851 A | 4/2004 |
| JP | 2005-315837 A | 11/2005 |
| JP | 2006-47282 A | 2/2006 |
| JP | 2006-234683 A | 9/2006 |
| JP | 2006-275840 A | 10/2006 |
| JP | 2007-40806 A | 2/2007 |
| JP | 2009-156582 A | 7/2009 |
| JP | 2011-149697 A | 8/2011 |
| JP | 2013-044602 A | 3/2013 |
| JP | 2014-119348 A | 6/2014 |

OTHER PUBLICATIONS

Official Communication issued in corresponding U.S. Appl. No. 15/008,624, dated May 24, 2018.

* cited by examiner $$T_2 = \begin{pmatrix} 1 \\ 1 \end{pmatrix}$$

$$T_2 = \begin{pmatrix} 1 \\ 0 \end{pmatrix}$$

$$T_2 = \begin{pmatrix} 0 \\ 1 \end{pmatrix}$$

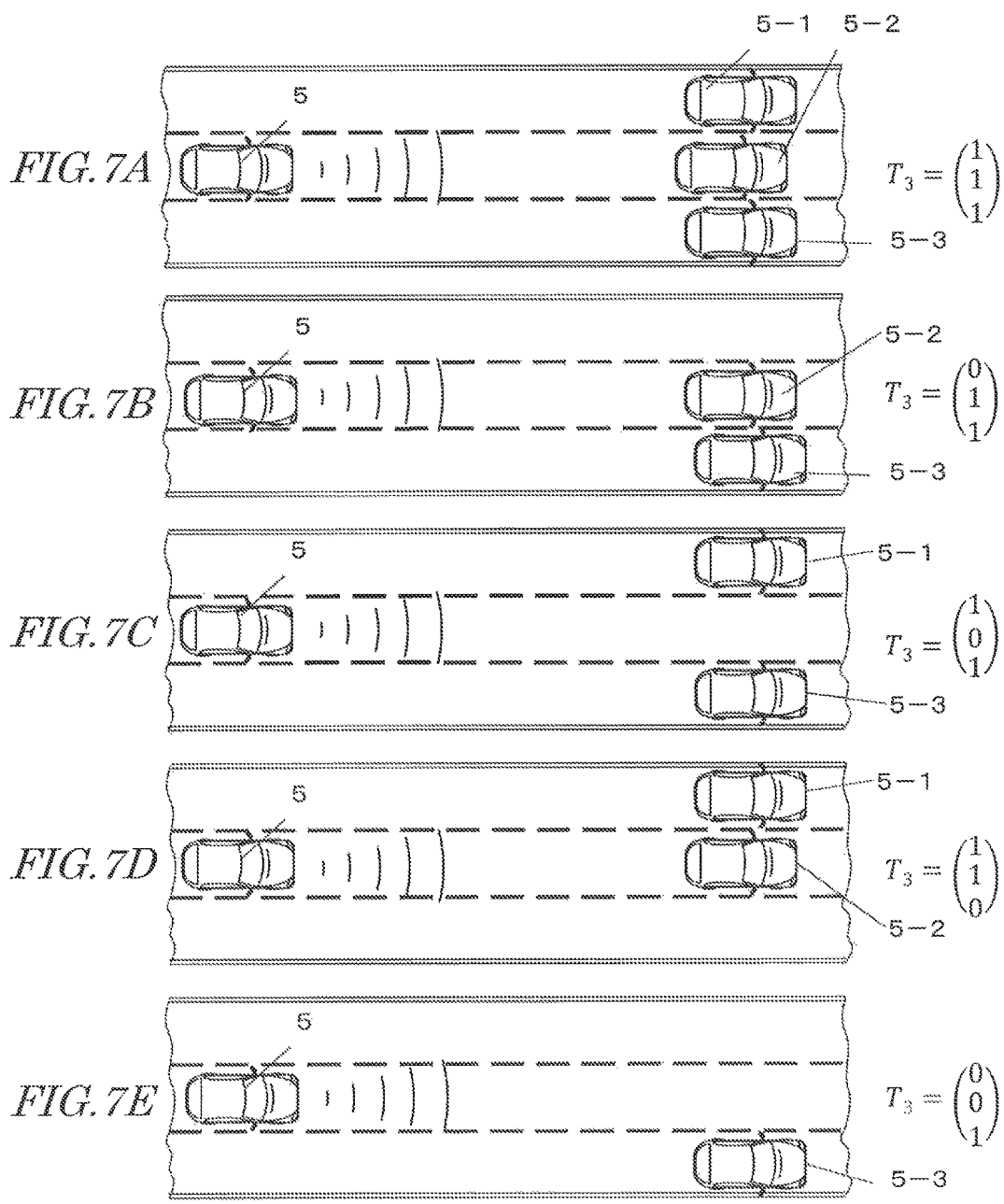

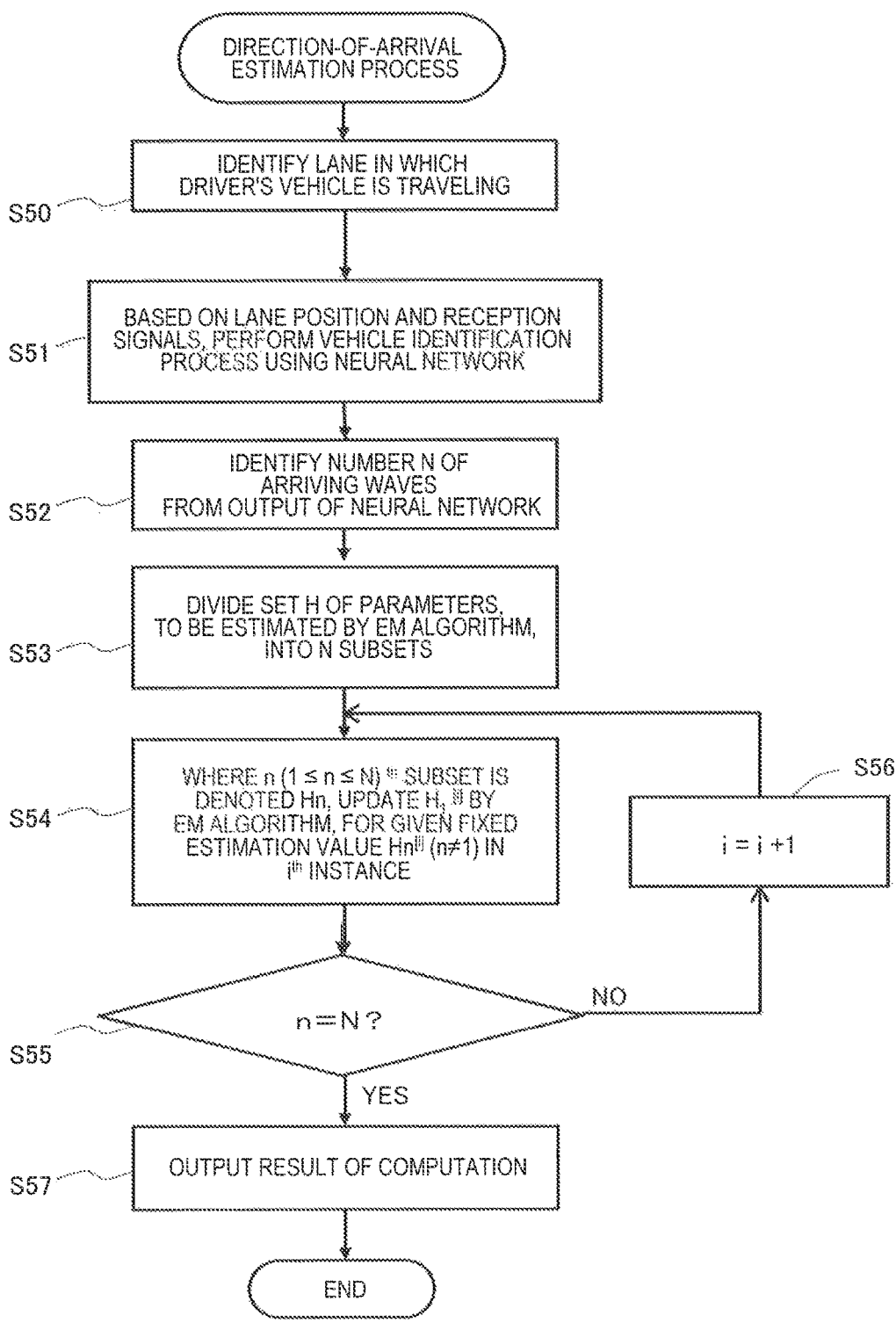

NEURAL NETWORK-BASED RADAR SYSTEM

BACKGROUND OF THE INVENTION

1. Field of the Invention

The present disclosure relates to a technique of recognizing a spatial distribution of one or more preceding vehicles by using a radar.

2. Description of the Related Art

Conventionally, onboard radar systems have utilized radars of various electronic scanning types which are based on the methods including FMCW (Frequency Modulated Continuous Wave) radar, multiple frequency CW (Continuous Wave) radar, and pulse radar, for example. In such radar systems, generally speaking, a modulated continuous wave, or alternatively a pulse wave, is emitted from a transmission antenna as a "transmission wave", and an arriving wave that is reflected from a preceding vehicle and returns to the reception antenna is received as a "reception wave". Then, from an antenna signal (reception signal) that is based on the reception wave, the position and velocity of the preceding vehicle are estimated. With reference to the vehicle having the radar system mounted thereon, the position of a preceding vehicle is defined by a distance ("range") between the vehicle having the radar system mounted thereon and the preceding vehicle, and the direction of the preceding vehicle. In the present specification, the vehicle having the radar system mounted thereon is referred to as "the driver's vehicle", whereas any vehicle traveling before or ahead of the driver's vehicle is referred to as a "preceding vehicle". It is assumed that a "preceding vehicle" may be traveling in the same lane as the driver's vehicle, or in an adjoining lane containing traffic traveling in the same direction as the driver's vehicle.

In an onboard radar system, the "direction" of a preceding vehicle can be defined by an azimuth within an approximate plane containing the road. Therefore, in the present specification, for a given object that is detected by a radar, the terms "direction" and "azimuth" may be synonymously used.

The direction of a preceding vehicle can be expressed by an angle of the direction of arrival (DOA: Direction Of Arrival)" of an arriving wave. In the field of radar technology, an object that reflects a transmission wave, such as a preceding vehicle, may be referred to as a "target". The target functions as a wave source of the "reflected wave". The target is a signal source of a wave that arrives at the reception antenna, i.e., a reception wave.

In a radar system for onboard use, a small-sized and inexpensive antenna is desirable. For example, an array antenna composed of four or five antenna elements is used as a receiving antenna. Depending on the manner in which the antenna elements are arrayed, an array antenna can be categorized into a linear array type, a planar array type, a circular array type, or a conformal array type.

Based on the reception signals which are obtained from the respective antenna elements in the array antenna, it is possible through a signal processing technique to estimate the azimuth (direction of arrival) of an object that reflects the transmission wave. However, in the case where plural objects exist to reflect a transmission wave, the wave reflected off each object will impinge on the reception antenna at a different angle. Therefore, the reception antenna will produce a complicated signal in which a plurality of arriving waves are superposed. Moreover, in an onboard radar system, the relative positioning and distance of an object, as taken with respect to the array antenna, change dynamically. Therefore, in order to accurately estimate the respective azimuth(s) of one or plural preceding vehicles based on the reception signals at the array antenna, a huge amount of computation needs to be rapidly done by a computer.

In order to estimate the direction of arrival, various algorithms for processing the reception signals at an array antenna have been proposed. Known algorithms for direction-of-arrival estimation include the following methods (see Japanese Laid-Open Patent Publication No. 2009-156582 and Japanese Laid-Open Patent Publication No. 2006-275840).

(1) Digital Beam Former (DBF) method
(2) Capon method
(3) linear prediction coding method
(4) minimum norm method
(5) MUSIC (MUltiple SIgnal Classification) method
(6) ESPRIT (Estimation of Signal Parameters via Rotational Invariance Techniques)) method Generally speaking, as the angular resolution of direction estimation increases, an increased amount of computation becomes needed for signal processing. In the aforementioned methods of direction-of-arrival estimation (1) to (6), angular resolution increases in the order from method (1) to method (6), thus requiring so much more computational processing. The MUSIC method and the ESPRIT method, which provide particularly high angular resolutions and are also called "super-resolution algorithms", require rapidly subjecting the reception signals at the array antenna to processes that require large computation amounts. Specifically, under a super-resolution algorithm, a spatial covariance matrix is generated from the data of respective reception signals at the array antenna. Then, through eigenvalue decomposition of this spatial covariance matrix, the direction of arrival of the reception wave is estimated. Eigenvalue decomposition of a matrix involves decomposing the matrix into a diagonal matrix having eigenvalues as its diagonal components. When a spatial covariance matrix is subjected to eigenvalue decomposition, eigenvalues and eigenvectors of the spatial covariance matrix are obtained (see, for example, Japanese Laid-Open Patent Publication No. 2006-047282).

The estimation accuracy of a direction of arrival improves as more noise components are removed from the spatial covariance matrix. Since it can be assumed from ergodicity that an ensemble average equals a time average, a spatial covariance matrix is generated by using a time average of received data. For example, in the case of an FMCW radar, it is preferable to maximize the number of samples, i.e., number of snapshots, for the data set of beat signals (that is, chronological data within a certain time slot which can be converted into frequency domain data), thus to utilize an averaged-out spatial covariance matrix. Thus, in order to enhance the accuracy of estimation of a direction of arrival in a situation where the position of a preceding vehicle may always be changing, rapid sampling needs to be performed, thus requiring greater memory capacity for the sampled data.

Super-resolution algorithms, e.g., MUSIC, require large amounts of computational processing. Expensive microprocessors for onboard use that can rapidly operate in order to handle such large amounts of computational processing are required. Due to such circumstances, attempts to reduce the amount of computational processing have been made in order to enable operation using microprocessors with relatively low performance (see, for example, Japanese Laid-Open Patent Publication No. 2007-040806).

However, even if the amount of computational processing is reduced by the technique of Japanese Laid-Open Patent Publication No. 2007-040806 or the like, there still remains a large amount of computational processing. Thus, a technique of target recognition is needed for radars for onboard use which requires an even smaller amount of processing.

SUMMARY OF THE INVENTION

An illustrative radar system according to a preferred embodiment of the present invention includes an array antenna including a plurality of antenna elements each of which outputs a reception signal in response to at least one arriving wave; and a signal processing circuit in which a learned neural network has been established, the signal processing circuit receiving the reception signals, inputting the reception signals or a secondary signal generated from the reception signals to the neural network, performing computation by using the reception signals or secondary signal, and learned data of the neural network, and outputting a signal indicating the number of arriving waves from the neural network.

With an illustrative radar system according to a preferred embodiment of the present invention, a reception signal or a secondary signal generated from the reception signals is able to be input to a learned neural network to obtain a signal indicating the number of arriving waves. The amount of computational processing needed for the computation by a neural network is so much less than the computational processing needed by a super-resolution algorithm such as MUSIC, and also the opportunity to adequately performing learning of a neural network in advance enhances the accuracy of determination of the number of arriving waves.

In one exemplary preferred embodiment of the present invention, the aforementioned number of arriving waves is acquired as information indicating a spatial distribution of preceding vehicles.

These general and specific aspects may be implemented using a system, a method, and a computer program stored on a computer readable medium, and any combination of systems, methods, and computer programs stored on a computer readable medium.

Additional benefits and advantages of the disclosed preferred embodiments of the present invention will be apparent from the specification and Figures. The benefits and/or advantages may be individually provided by the various preferred embodiments and features of the specification and drawings disclosure, and need not all be provided in order to obtain one or more of the same.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 7A, 7B, 7C, 7D and 7E are diagrams each showing a situation of travel concerning a preceding vehicle (5-1), (5-2) and/or (5-3) when the driver's vehicle 5 is traveling in the center lane among three lanes, as well as a training signal $T_3$.

FIG. 19 is a flowchart showing the procedure of a direction-of-arrival estimation process utilizing the SAGE method.

DETAILED DESCRIPTION OF THE PREFERRED EMBODIMENTS

Figure 1:
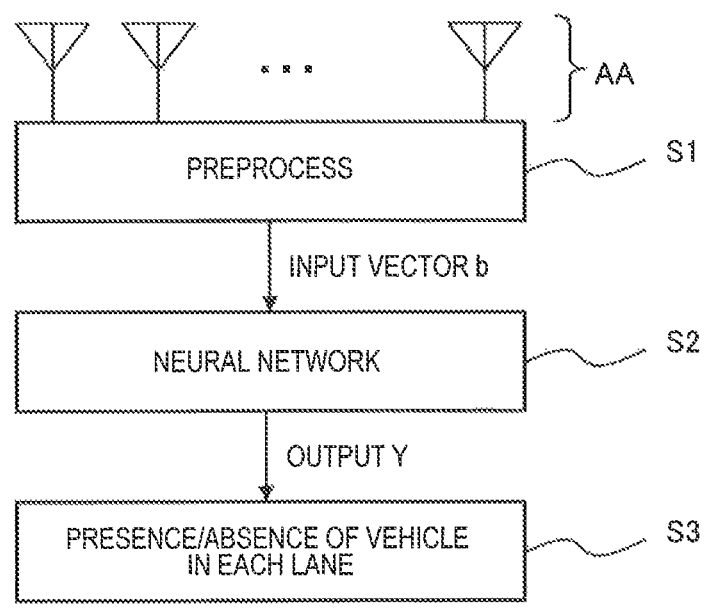
FIG. 1 is a diagram showing the procedure of a vehicle identification process according to a preferred embodiment of the present invention.

In the following description of various preferred embodiments of the present invention, certain terms are used which shall have the following meanings.

A "vehicle" is any vehicle able to travel on roads or other surfaces, the vehicle including an engine and/or an electric motor to generate driving force for traveling. A vehicle encompasses a 4-wheeled automobile, a 3-wheeled automobile, and a motorcycle, for example. A part or a whole of a vehicle's travel may take place under automatic control, or even be an unmanned travel.

A "reception signal" is an output signal (either analog or digital) from an antenna element of an array antenna.

A "secondary signal" is a signal which is obtained by processing a reception signal. Examples of the secondary signal include a beat signal, a signal containing non-diagonal components of a spatial covariance matrix, and an analytic signal. As used herein, an "analytic signal" is a complex signal which is expressed as a sum of a reception signal (real-number component) and an orthogonal signal (imaginary-number component) of the reception signal. An orthogonal signal of a reception signal can be generated from the reception signal by Hilbert transform, for example.

"Learned data" includes weight values to be applied to inputs to the nodes of an artificial neural network.

An "arriving wave" is an electromagnetic wave which arrives to an array antenna from a target (a wave source or a signal source). When the array antenna is mounted on the front face of the driver's vehicle, a typical example of a target serving as a wave source of an arriving wave is a preceding vehicle.

The inventors have made discoveries described below.

In safety technology of automobiles, e.g., collision avoidance systems or automated driving, it is particularly essential to identify a plurality of vehicles (targets) that are traveling side by side ("abreast of each other") in positions at an identical distance from the driver's vehicle. In the present specification, an "identical distance" not only means exactly the same distance, but also includes differences equal to or smaller than the resolution of a given radar system in terms of distance. In this context, it has been believed that identifying the preceding vehicles essentially requires estimating the direction of arriving waves therefrom.

Techniques which have conventionally been practiced to estimate directions of arriving waves by use of an array antenna are aimed at how accurately the direction of arrival (angle) of each arriving wave is able to be identified. The rationale is that accurately identifying each arriving wave would mean accurately identifying the position of a preceding vehicle.

As described above, various methods utilizing a spatial covariance matrix have been developed, and resolutions needed for identifying a direction of arrival with a high accuracy have been realized. However, a very large computational processing amount is still required to generate a spatial covariance matrix and calculate eigenvectors, making it necessary to use a processor having a commensurate high processing ability. A high-performance processor would lead to an increase in cost.

Note that in various methods utilizing a spatial covariance matrix, spatial averaging must be used when detecting plural arriving waves with high correlation. During calculation, the dimension of the array of the array antenna is decreased by one, meaning a decrease in the number of arriving waves that are simultaneously detectable. Maximum likelihood estimation techniques such as the SAGE (Space-Alternating Generalized Expectation-maximization) method can detect plural arriving waves with high correlation, but require prior knowledge (information) of the number of arriving waves.

When applying a technique of arriving wave direction estimation to a radar system for onboard use, more rapid response is preferred because, on the road, the position and velocity of the driver's vehicle and the position and velocity of a preceding vehicle will undergo incessant changes, which need to be obtained and understood accurately and rapidly. Moreover, in order to achieve avoidance of vehicle collision, reduction of collision damage, lane-keeping assist, there is an arising need to acquire ambient information by using image sensors or other radars, and perform various signal processing. It will not be practical to incorporate a processor with an excessively high processing ability to achieve such various signal processing. Moreover, even if a high-performance processor were adopted, there would be no guarantee of a sufficiently rapid response. Thus, various attempts are being made in order to reduce the computational processing amount in algorithms for direction-of-arrival estimation.

From an entirely different standpoint than heretofore, the inventors of preferred embodiments of the present invention have studied techniques of reducing the computation amount needed for signal processing in radar systems. The conventional reason behind the desire to identify the direction of arrival of each arriving wave with a high accuracy is that, by using the results of such identification, the number of preceding vehicles and their positions will be accurately known. However, actually, the information that is ultimately needed should be how many preceding vehicles there are and which lanes the preceding vehicles are traveling in.

Hence, the inventors of preferred embodiments of the present invention have sought techniques which, without having to calculate the direction of arrival of each arriving wave, determine the number of preceding vehicles and the lanes in which the preceding vehicles are traveling. The inventors have thus discovered that using a neural network for the signal processing in an array antenna makes it possible to directly determine the number of preceding vehicles and the lanes in which the preceding vehicles are traveling, without having to accurately determine the direction of each individual preceding vehicle (the direction of arrival of the respective reflected wave). As a result of this, the calculation amount of signal processing and computational processing amount needed to quickly and accurately determine a situation of travel concerning preceding vehicles are able to be greatly reduced.

Note that, during travel in adaptive cruise control (which hereinafter may be abbreviated as "ACC") mode, it is usually unnecessary to know the angle indicating an accurate azimuth of a preceding vehicle, so long as the following is available: information as to whether any preceding vehicles exist in the same lane (or an adjoining lane) as the driver's vehicle, the distance between the driver's vehicle and each preceding vehicle, and information indicating the velocity of each preceding vehicle.

Hereinafter, prior to describing the preferred embodiments of the present invention, fundamental principles behind the discoveries made by the inventors of preferred embodiments of the present invention will be described.

The present specification will describe a learning process by a neural network, and also a process of identifying the number of preceding vehicles and their spatial distribution through use of a learned neural network. Once a learning process is performed, subsequent processes of identification are enabled. In a radar system for onboard use according to a preferred embodiment of the present invention, typically, a learning process may be performed before mounting of the radar system, and an identification process may be performed during driving by a driver, this identification process being performed by a signal processing circuit such as a processor, microprocessor, Central Processing Unit (CPU), etc., which is mounted in the vehicle.

One advantage of utilizing a neural network is being able to significantly reduce the calculation and computational processing resources needed for the identification process, as compared to any process which uses a high resolution algorithm to estimate the directions of arrival of the arriving waves and to detect the number of preceding vehicles and their spatial distribution. Hereinafter, the identification process will be first described with reference to FIG. 1, and thereafter, the particulars of the learning process will be described while also explaining the respective steps in the identification process.

FIG. 1 shows procedure process of a vehicle identification process according to a preferred embodiment of the present invention. Each process step in FIG. 1 is executed by a signal processing circuit including in a processor, microprocessor, CPU, etc.

First, at step S1, the signal processing circuit applies preprocessing to an array reception signal which is acquired by an array antenna AA including M antenna elements (where M is an integer of 3 or more; the same will also be true hereinbelow) to generate an input vector b. The details of the input vector b will be described later. This array reception signal contains noise.

At step S2, the signal processing circuit inputs the input vector b to a learned neural network.

At step S3, the signal processing circuit determines whether a vehicle exists or not in each lane, based on an output Y of the neural network.

Hereinafter, steps S1 to S3 will each be described in more detail.

Figure 2A:
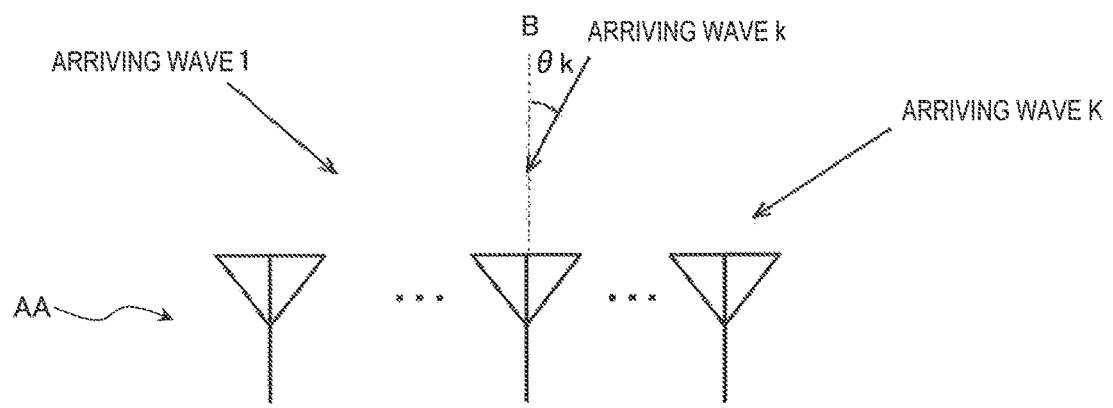
FIG. 2A is a diagram showing a relationship between an array antenna AA including M antenna elements in a linear array and plural arriving waves k (k: an integer from 1 to K).

FIG. 2A shows a relationship between the array antenna AA including M antenna elements in a linear array and plural arriving waves k (where k is an integer from 1 to K; the same will also be true hereinbelow; K will be defined later). The array antenna AA receives plural arriving waves that simultaneously impinge at various angles. The incident angle of each arriving wave (i.e., the angle representing its direction of arrival) is an angle with respect to the broadside B of the array antenna AA (i.e., a direction perpendicular or substantially perpendicular to the direction of the line along which the antenna elements are arrayed).

Now, consider a $k^{th}$ arriving wave. Where K arriving waves are impinging on the array antenna from K targets existing at different azimuths, a "$k^{th}$ arriving wave" means an arriving wave which is identified by an incident angle $\theta_k$.

Figure 2B:
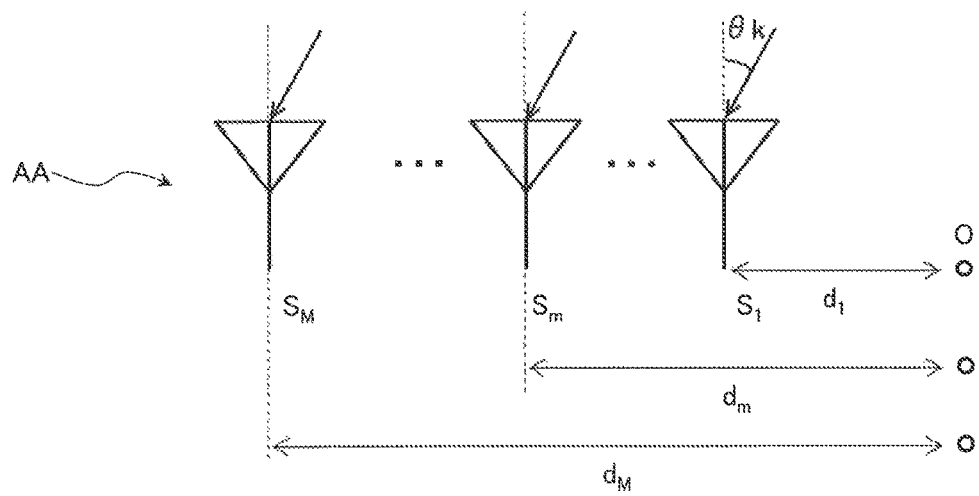
FIG. 2B is a diagram showing an array antenna AA receiving a $k^{th}$ arriving wave.

FIG. 2B shows the array antenna AA receiving the $k^{th}$ arriving wave. The signals received by the array antenna AA can be expressed as a "vector" having M elements, by Equation 1 below.

$$S=[s_1,s_2,\ldots,s_M]^T \qquad \text{Equation 1}$$

In the above, $s_m$ (where m is an integer from 1 to M; the same will also be true hereinbelow) is the value of a signal which is received by an $m^{th}$ antenna element. The superscript $^T$ means transposition. S is a column vector. The column vector S is defined by a product of multiplication between a direction vector (a steering vector or a mode vector) as determined by the construction of the array antenna and a complex vector representing a signal from each wave source (a signal source, i.e., a target). When the number of wave sources is K, the waves of signals arriving at each individual antenna element from the respective K wave sources are linearly superposed. In this state, it is known that $s_m$ can be expressed by Equation 2 below.

$$s_m = \sum_{k=1}^{K} a_k \exp\left\{j\left(\frac{2\pi}{\lambda}d_m\sin\theta_k + \varphi_k\right)\right\} \qquad \text{Equation 2}$$

In Equation 2, $a_k$, $\theta_k$ and $\varphi_k$ respectively denote the amplitude, incident angle (i.e., the angle representing its direction of arrival), and initial phase of the $k^{th}$ arriving wave. Moreover, $\lambda$ denotes the wavelength of an arriving wave, and j is an imaginary unit.

As will be understood from Equation 2, $s_m$ is expressed as a complex number consisting of a real part (Re) and an imaginary part (Im).

When this is further generalized by taking noise (internal noise or thermal noise) into consideration, the array reception signal X can be expressed as Equation 3 below.

$$X=S+N \qquad \text{Equation 3}$$

N is a vector expression of noise.

At step S1 in FIG. 1, the signal processing circuit generates a spatial covariance matrix Rxx (Equation 4, below) of arriving waves by using the array reception signal X expressed by Equation 3, and further generates a signal (Equation 5, below) containing non-diagonal components of the spatial covariance matrix Rxx.

$$R_{xx} = XX^H = \begin{bmatrix} Rxx_{11} & \cdots & Rxx_{1M} \\ \vdots & \ddots & \vdots \\ Rxx_{M1} & \cdots & Rxx_{MM} \end{bmatrix} \qquad \text{Equation 4}$$

In the above, the superscript $^H$ means complex conjugate transposition (Hermitian conjugate).

$$b_0=[Re(Rxx_{12}),Im(Rxx_{12})\ldots,Re(Rxx_{1M}),Im(Rxx_{1m}),\\ Re(Rxx_{23}),Im(Rxx_{23}),\ldots,Re(Rxx_{2M}),Im\\ (Rxx_{2M}),\ldots,Re(Rxx_{(M-1)M}),Im(Rxx_{(M-1)M})]^T \qquad \text{Equation 5}$$

The vector $b_0$ is a column vector expressing, in terms of real and imaginary parts, the elements of an upper triangular matrix (excluding the diagonal components) of the spatial covariance matrix Rxx. "Re ($Rxx_{pq}$)" corresponds to the real part of a (p,q) component of the spatial covariance matrix, whereas "Im($Rxx_{pq}$)" corresponds to the imaginary part of the (p,q) component of the spatial covariance matrix.

The signal processing circuit converts (i.e., normalize) the vector b0 into a unit vector, thus deriving a vector b to be input to the neural network using Equation 6 below.

$$b = \frac{b_0}{\|b_0\|} \qquad \text{Equation 6}$$

The denominator ($\|b_0\|$) on the right-hand side represents the norm of the vector b0.

The reason for conducting normalization as indicated by Equation 6 is to prevent excessive input to the neural network; however, normalization is not essential. In the present specification, the aforementioned vector $b_0$ and/or b may be referred to as a secondary signal that is generated from reception signals.

In the above description, the array reception signal X which is obtained at the array antenna AA is directly utilized to obtain a spatial covariance matrix. However, another signal which is derivable from the array reception signal X may be used to obtain the aforementioned spatial covariance matrix. An example of another signal may be a beat signal which is generated by utilizing a transmission signal and a reception signal.

Next, the neural network to be used at step S2 in FIG. 1 will be described in detail.

Figure 3:
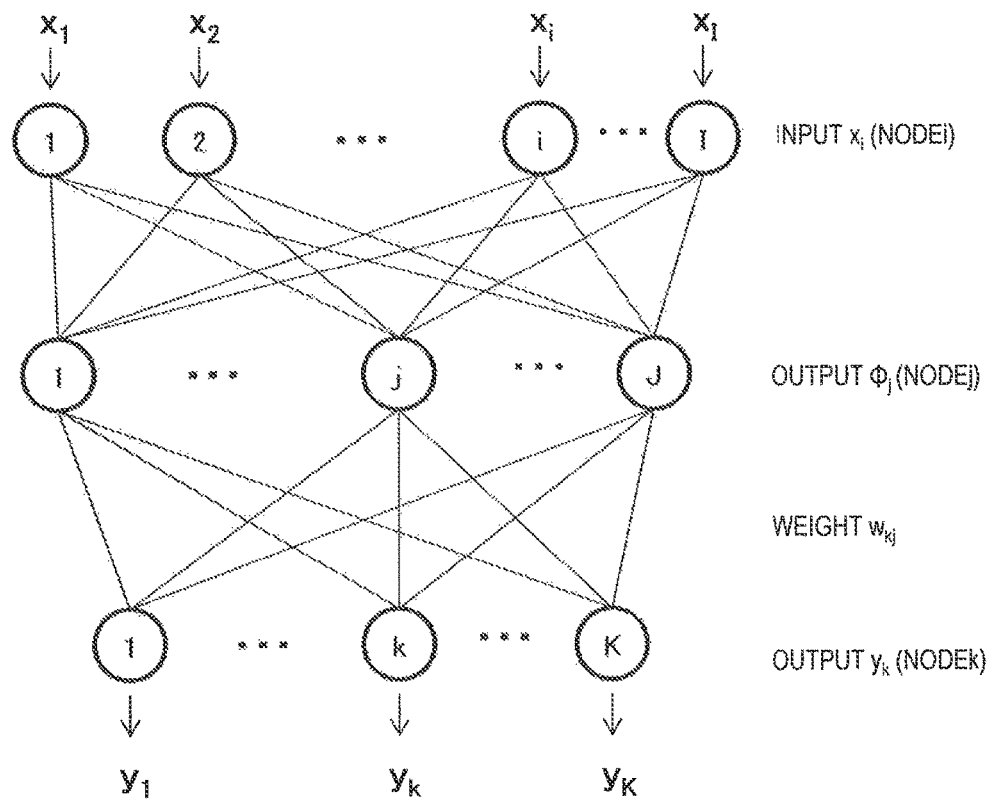
FIG. 3 is a diagram showing the structural model of a generic hierarchical neural network.

FIG. 3 shows a structural model of a generic hierarchical neural network. Although the present specification will illustrate an RBF (radial basis function) neural network, which is a kind of hierarchical neural network, any other hierarchical neural network or non-hierarchical neural network may instead be used.

As shown in FIG. 3, the RBF neural network includes an input layer $x_i$ of nodes 1 to I to accept input signals $x_i$ (where i is an integer from 1 to I), a hidden layer $\phi_j$ of nodes 1 to J (where j is an integer from 1 to J), and an output layer $y_k$ of nodes 1 to K (where k is an integer from 1 to K).

The output $y_k(x)$ of the RBF network is expressed by Equation 7 below.

$$y_k(x) = \sum_{j=1}^{J} w_{kj} \phi_j(x - c_j) \qquad \text{Equation 7}$$

In Equation 7, J is the number of neurons in the hidden layer; $w_{kj}$ is a weight between a $j^{th}$ neuron in the hidden layer and a $k^{th}$ neuron in the output layer; $c_j$ is a central vector of the $j^{th}$ neuron in the hidden layer; and x is the input vector. Moreover, $\phi_j$ is a Gaussian kernel function as indicated by Equation 8 below.

$$\phi_j(x - c_j) = \exp\left\{-\frac{(x - c_j)^T (x - c_j)}{2\sigma_j^2}\right\} \qquad \text{Equation 8}$$

In Equation 8, $\sigma_j$ is a parameter representing the width of the central vector of the $j^{th}$ neuron in the hidden layer.

Figure 4:
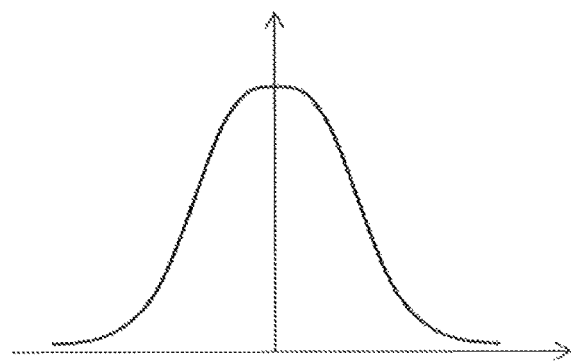
FIG. 4 is a diagram schematically showing the waveform of a Gaussian kernel function.

FIG. 4 schematically shows the waveform of the Gaussian kernel function indicated by Equation 8. The horizontal axis represents input, and the vertical axis represents output. As will be understood from FIG. 4, each neuron in the hidden layer exhibits a large response only when the input vector is close to the central vector in the RBF. In other words, each neuron in the hidden layer responds only to a specific input.

The RBF neural network is able to learn a relationship between a pattern which is fed to the input layer $x_i$ and a pattern to be output from the output layer $y_k$ (which should ideally be the training signal).

The inventors have envisaged an implementation where an RBF neural network is utilized in recognizing the number of preceding vehicles (one or more) traveling ahead of the driver's vehicle, and their spatial distribution, by using a radar system.

During learning of the RBF neural network, the pattern that is fed to the input layer $x_i$ of the RBF neural network is the vector b expressed by Equation 6, which is obtained from the array reception signal X. On the other hand, the training signal that is fed is a signal (in vector expression) specifying the number of preceding vehicles (one or more) and their spatial distribution as existing when that vector b was obtained. This mapping will be repeatedly learned to a point where a signal which is output in response to any given pattern that is fed to the input layer $x_i$ will be a signal reflecting the learning results, i.e., one that accurately identifies the number of preceding vehicles (one or more) and their spatial distribution.

Hereinafter, the learning method by the RBF neural network will be specifically described.

The inventors have envisaged the following example situations of travel concerning the driver's vehicle in which the radar system according to various preferred embodiments of the present invention is mounted.

(A) Between two adjoining lanes (first and second lanes) of the same direction, the driver's vehicle is traveling in the first lane.

(B) Between two adjoining lanes (first and second lanes) of the same direction, the driver's vehicle is traveling in the second lane.

(C) Between three contiguous lanes (first to third lanes) of the same direction, the driver's vehicle is traveling in the second lane (center lane).

FIGS. 5A to 5D each show a situation of travel concerning a preceding vehicle (5-1) and/or (5-2) when the driver's vehicle 5 is traveling in the first lane, as well as a training signal $T_1$. FIGS. 5A to 5D correspond to example situation (A) above. In the present specification, the first lane, the second lane, and so on, are ordered in the direction from top to bottom in each figure.

FIGS. 6A to 6D each show a situation of travel concerning a preceding vehicle (5-1) and/or (5-2) when the driver's vehicle 5 is traveling in the second lane, as well as a training signal $T_2$. FIGS. 6A to 6D correspond to example situation (B) above.

FIGS. 7A to 7E each show a situation of travel concerning a preceding vehicle (5-1), (5-2) and/or (5-3) when the driver's vehicle 5 is traveling in the center lane among three lanes, as well as a training signal $T_3$. FIGS. 7A to 7E correspond to example situation (C) above.

Figure 5A:
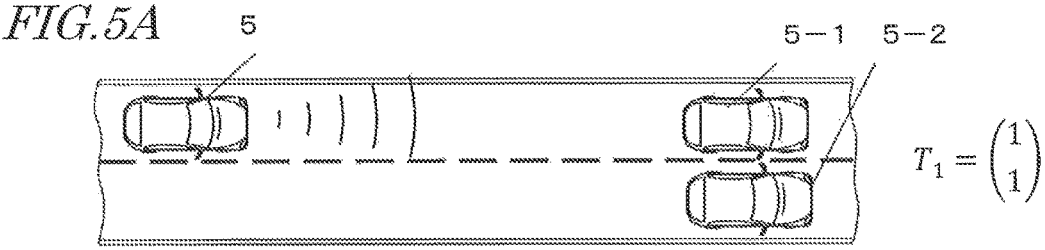
FIGS. 5A, 5B, 5C and 5D are diagrams each showing a situation of travel concerning a preceding vehicle (5-1) and/or (5-2) when the driver's vehicle 5 is traveling in the first lane, as well as a training signal $T_1$.
Figure 5B:
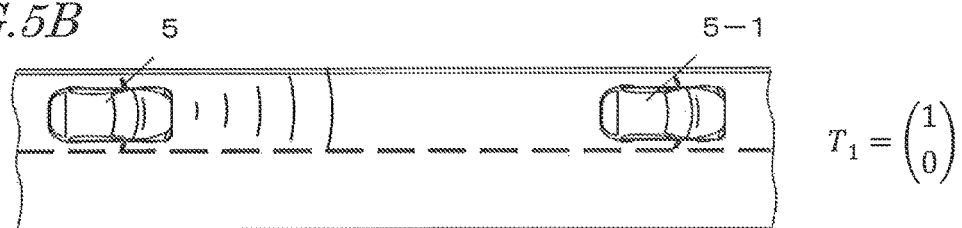
Figure 5C:
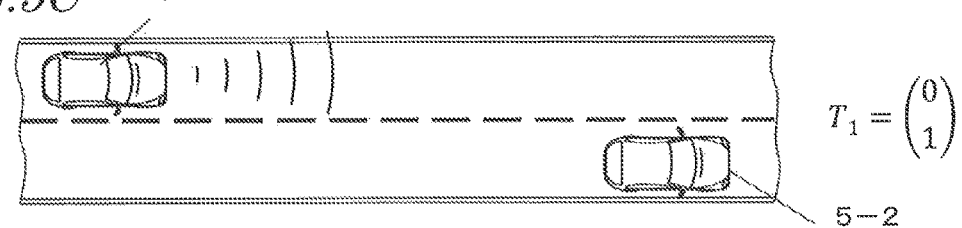
Figure 5D:
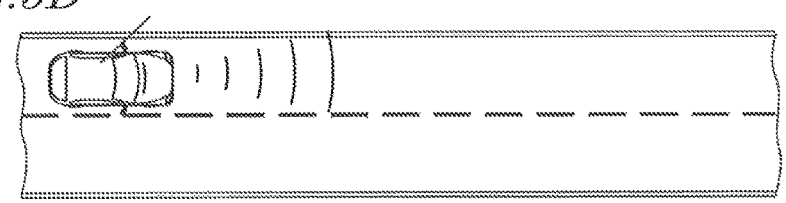
Figure 6A:
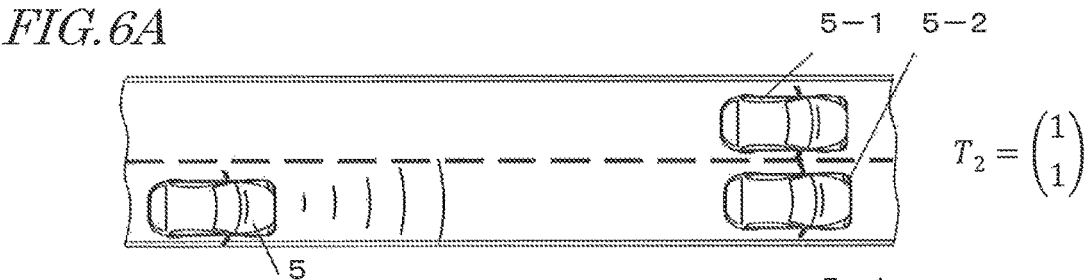
FIGS. 6A, 6B, 6C and 6D are diagrams each showing a situation of travel concerning a preceding vehicle (5-1) and/or (5-2) when the driver's vehicle 5 is traveling in the second lane, as well as a training signal $T_2$.
Figure 6B:
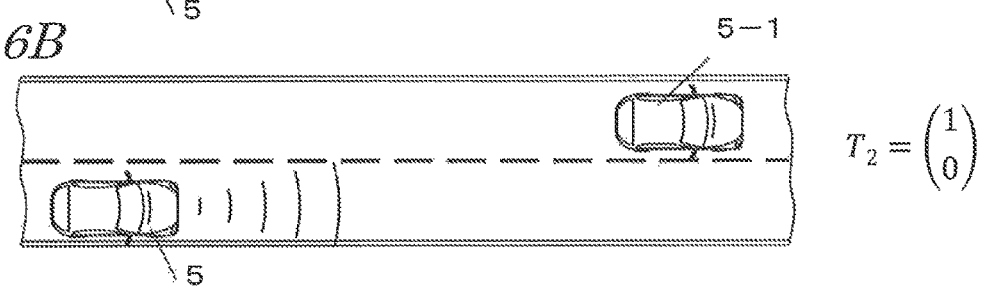
Figure 6C:
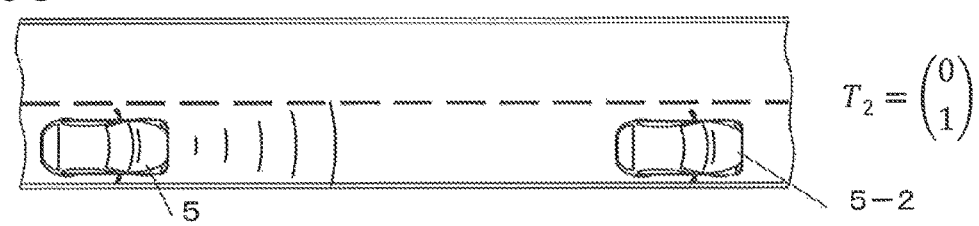
Figure 6D:
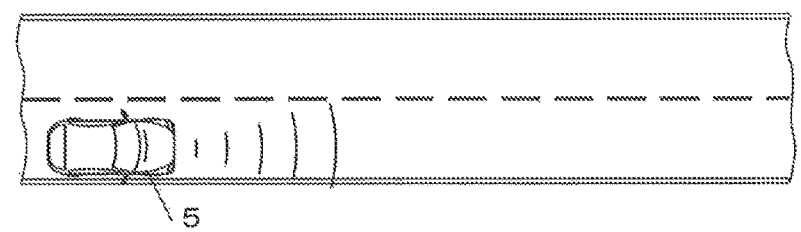

In the present specification, FIG. 5D and FIG. 6D are conveniently excluded from among the patterns of preceding vehicles to be detected by using the radar system. Hereinafter, three patterns of in FIGS. 5A, 5B and 5C and FIGS. 6A, 6B and 6C will be discussed.

Note also that FIGS. 7A to 7E do not encompass all situations of travel. In actuality, situations of travel may exist in a total of 8 patterns, for example. Specifically, a pattern in which a single target (which in FIG. 7E is traveling in the third lane) is traveling in the second lane, a pattern in which a single target is traveling in the first lane, and a pattern in which no target exists are omitted. In FIGS. 7A to 7E, too, a pattern in which no preceding vehicle exists is conveniently excluded from among the patterns of targets to be detected by using the radar system.

In connection with example situation (C) above and FIGS. 7A to 7E, what makes it unnecessary to consider the cases of the driver's vehicle traveling in the first lane or the third lane among three contiguous lanes of the same direction is because the inventors have adopted the following operating condition: the radar system shall be able to recognize another car in an adjoining lane when the driver's vehicle switches lanes. When the driver's vehicle switches from the first lane to the second lane, it suffices if vehicles in the first lane and the second lane can be identified; this case can be regarded as the example situations (A) or (B) defined above. The same is also true when the driver's vehicle switches from the third lane to the second lane.

Figure 8:
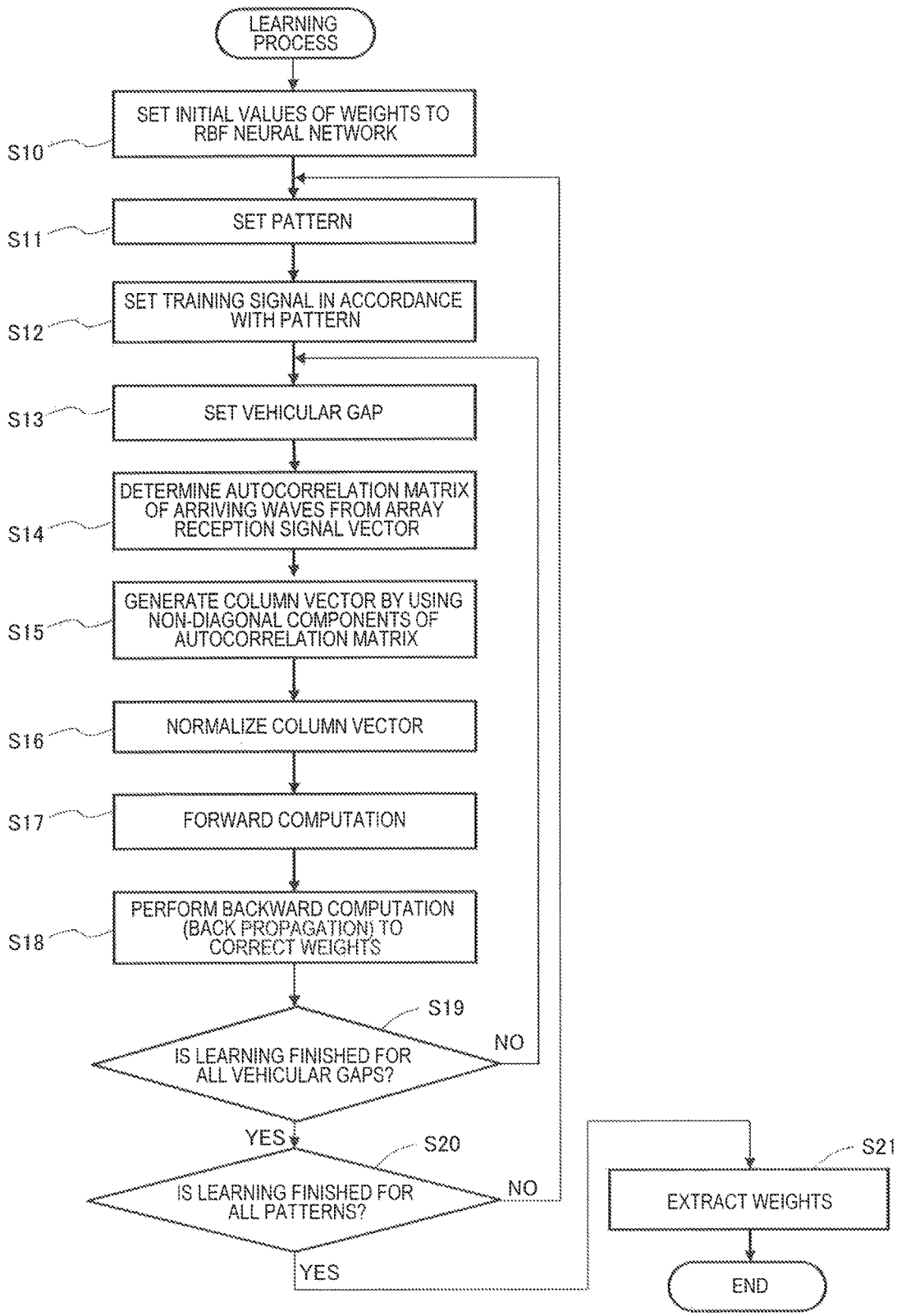
FIG. 8 is a flowchart showing the procedure of a learning process.

FIG. 8 is a flowchart showing a procedure of the learning process. Through the learning process, three kinds of neural network are to be established: a neural network of the case where the driver's vehicle exists in the first lane between two lanes of the same direction (FIGS. 5A to 5D); a neural network of the case where the driver's vehicle exists in the second lane between two lanes of the same direction (FIGS. 6A to 6D); and a neural network of the case where the driver's vehicle exists in the second lane among three lanes of the same direction (FIGS. 7A to 7E).

In the example of FIGS. 5A to 5D, the learning process establishes one neural network from the three patterns shown in FIGS. 5A, 5B and 5C. In the example of FIGS. 6A to 6D, the learning process establishes one neural network from the three patterns shown in FIGS. 6A, 6B and 6C. In the example of FIGS. 7A to 7D, the learning process establishes one neural network from seven patterns including FIGS. 7A, 7B, 7C, 7D and 7E. Furthermore, the learning process is preferably performed at least about 80 times, for example, for each pattern, under varying conditions concerning the vehicular gap between the driver's vehicle and a preceding vehicle. Specifically, the vehicular gap preferably is varied in about 1 m increments from about 20 m to about 100 m, for example; for each vehicular gap that is set, the learning process emits a radio wave, and uses an array reception signal that is obtained from reflected waves having been received, and generates an input vector b (Equation 6) for the respective vehicular gap. The learning results to be attained are weights which will allow the input vector b to accurately map to the training signal for each pattern shown in FIGS. 5A to 5D, FIGS. 6A to 6D, or FIGS. 7A to 7E.

Hereinafter, FIG. 8 will be described. The process shown in FIG. 8 is to be performed in each of the situations of FIGS. 5A to 5D, FIGS. 6A to 6D, and FIGS. 7A to 7E. Each process in FIG. 8 is executed by a signal processing circuit. The signal processing circuit may be, for example, a processor, microprocessor, CPU, etc., which is mounted in a piece of equipment owned by the manufacturer who makes the radar system for onboard use.

At step S10, the signal processing circuit sets initial values of weights to the RBF neural network.

At step S11, the signal processing circuit sets a pattern to be learned.

At step S12, the signal processing circuit sets a training signal in accordance with the pattern.

At step S13, the signal processing circuit sets a vehicular gap. The initial value preferably is about 20 m, for example.

At step S14, the signal processing circuit generates a spatial covariance matrix Rxx (Equation 4) of arriving waves from the array reception signal vector X (Equation 3).

At step S15, the signal processing circuit generates a column vector b0 (Equation 5) by using non-diagonal components of the spatial covariance matrix.

At step S16, the signal processing circuit determines a column vector b (Equation 6) by normalizing the column vector b0.

At step S17, the signal processing circuit performs computation (forward computation) by using Equation 7 and Equation 8.

At step S18, the signal processing circuit determines a mean squared error between the obtained results and the training signal serving as a reference, and performs computation (backward computation) of correcting the weights so as to minimize the mean squared error. The corrected weights are to be utilized in any subsequent learning.

At step S19, the signal processing circuit determines whether learning has been finished with respect to all vehicular gaps. If such is finished, the process proceeds to step S20; if such is not finished, the process returns to step S13. Upon returning to step S13, a vehicular gap which is incremented by about 1 m, for example, preferably is set.

At step S20, the signal processing circuit determines whether learning has been finished for all patterns. It such is finished, the process proceeds to step S21; if such is not finished, the process returns to step S11. Upon returning to step S11, another pattern is set.

At step S21, the signal processing circuit extracts the obtained weights as the result of learning (learned data). Thus, the learning process is finished.

Steps S14 to S16 above may have been performed in advance. That is, the following may have been separately performed in a previous instance: continuously acquire an array reception signal while varying the vehicular gap and store the acquired information; generate a spatial covariance matrix; generate a column vector utilizing non-diagonal components; and so on.

Although the above description illustrates the two-lane examples of FIGS. 5A to 5D and FIGS. 6A to 6D separately from the three-lane example of FIGS. 7A to 7E, such is just an exemplification and is in no way limiting. Instead of using a three-lane pattern, two-lane patterns may be used in combination. For example, the pattern of FIG. 7A can be realized as a combination of the two patterns of FIG. 5A and FIG. 6A. The pattern of FIG. 7B can be realized as a combination of the two patterns of FIG. 5A and FIG. 6C. The pattern of FIG. 7C can be realized as a combination of the two patterns of FIG. 5C and FIG. 6B. The pattern of FIG. 7D can be realized as a combination of the two patterns of FIG. 5B and FIG. 6A. The pattern of FIG. 7E can be realized as a combination of the two patterns of FIG. 5C and FIG. 6D. Note that the patterns of FIG. 5D and FIG. 6D can be recognized through an image recognition process using a camera, for example.

Other patterns not shown in FIGS. 7A to 7E can also be specified by combining two-lane patterns. When such variants are adopted, the learning process may only be directed to the two lanes illustrated in FIGS. 5A to 5D and FIGS. 6A to 6D.

Figure 9:
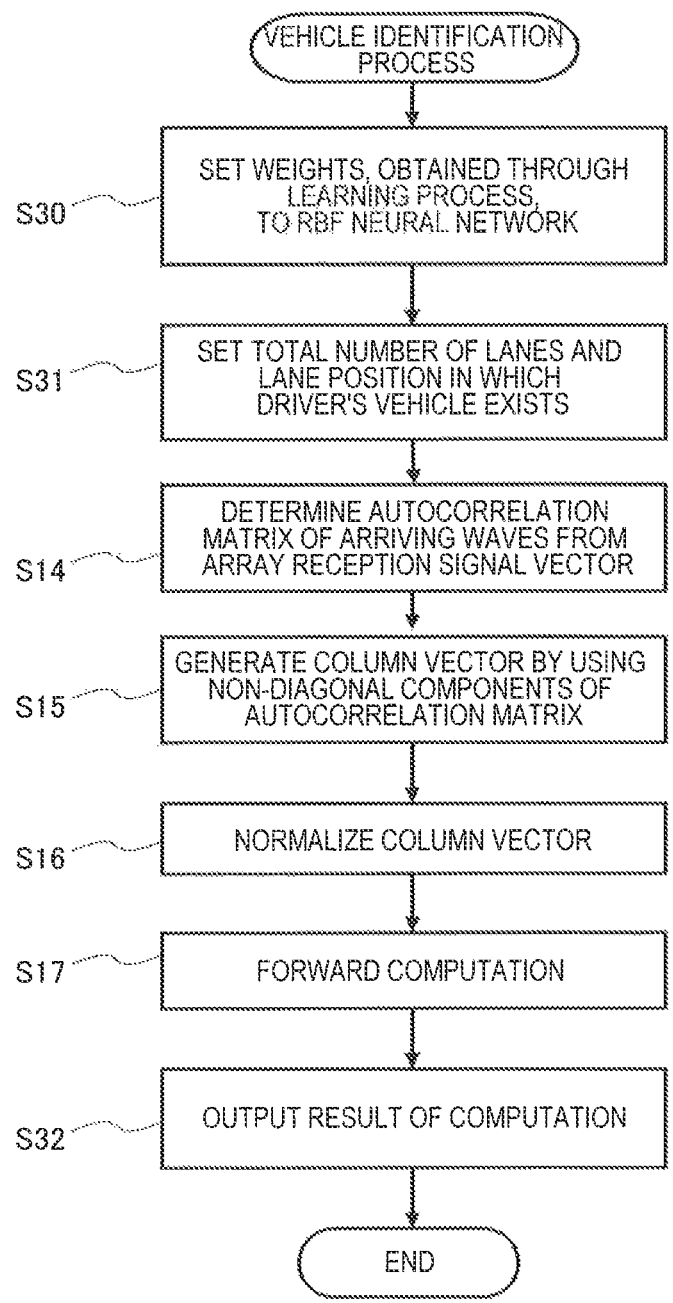
FIG. 9 is a flowchart showing the procedure of a preceding vehicle identification process.

FIG. 9 is a flowchart showing a procedure of a preceding vehicle identification process. This process is to be subsequently executed by using the learned data which is obtained by performing the learning process shown FIG. 8. Each process step of FIG. 9 is also executed by the signal processing circuit. However, this signal processing circuit does not need to be the same signal processing circuit that executed the processes of FIG. 8. The signal processing circuit that executes the process of FIG. 9 may be contained in an electronic control unit (ECU) of the radar system which is mounted in the vehicle, for example.

FIG. 9 includes steps S14 to S17, which are identical to those in the process of FIG. 8. These are denoted by like step numbers, with their descriptions being omitted.

At step S30, the signal processing circuit sets to the RBF neural network the weights (learned data) which have been obtained through the learning process.

At step S31, the signal processing circuit sets a total number of road lanes containing traffic in the same direction as the driver's vehicle is traveling, and also sets a current lane position of the driver's vehicle. In the present specification, the total number of lanes is preferably assumed to be two or three, for example. In the case where two lanes of the same direction exist, the current lane position of the driver's vehicle is preferably assumed to be the first lane or the second lane; in the case where three lanes of the same direction exist, the current lane position of the driver's vehicle is preferably assumed to be the first lane, the second lane, or the third lane. In the example of three lanes, any situation where the driver's vehicle is in the first lane or the third lane may be treated as an instance where the total number of lanes is two.

Next, at step S14, the signal processing circuit generates a spatial covariance matrix Rxx (Equation 4) of arriving waves from the array reception signal vector X (Equation 3). At this point, the vehicular gap between the driver's vehicle and the preceding vehicle does not need to be specified; however, preferably, it is within the range from about 20 m to about 100 m, for example, for which the learning has been performed. Thereafter, steps S15 to S17 are consecutively performed.

At step S32, the signal processing circuit outputs a result T of computation performed at step S17. An exemplary output of the computation result T may be as follows.

(a) $T=[1\ 0]^T$
(b) $T=[0\ 1]^T$
(c) $T=[1\ 1]^T$

The right-hand side expression of the computation result T indicates presence or absence of a preceding vehicle in each lane. In the case of two lanes, the first row in the column vector indicates presence or absence of a preceding vehicle in the first lane, and the second row in the column vector indicates presence or absence of a preceding vehicle in the second lane. For example, the output result T in (b) above indicates that no preceding vehicles in the first lane but that a preceding vehicle exists in the second lane.

At the above-described step S14 in FIG. 8 and FIG. 9, a spatial covariance matrix of arriving waves is determined from an array reception signal vector. However, as has been mentioned earlier, a vector of beat signals may be used instead of an array reception signal vector.

Thus, the principles behind the present disclosure have been described.

In the case where a direction of arrival is to be estimated for each target, a very high estimation accuracy may possibly be required depending on the distance to the target. For example, in a situation where plural vehicles are traveling abreast of each other about 100 m ahead, for example, an angular resolution of about 1 degree or less will be required (assuming that wave sources of the respective preceding vehicles are about 2 m apart) in order to identify the direction of a reflected wave reflected from each vehicle (i.e., an arriving wave reaching the driver's vehicle). In order to realize such an angular resolution with a conventional technique, a high resolution algorithm for direction-of-arrival estimation will be needed, thus requiring a huge amount of computational processing.

On the other hand, with the inventors' technique of distinguishing the number of preceding vehicles by using a neural network, it is possible through simple computation to directly determine how many preceding vehicles there are, and which lanes the preceding vehicles are traveling in, by previously completing learning corresponding to the above-described situations.

Although the above description illustrates a real-valued neural network (RBF neural network) as an example, a complex-valued neural network may alternatively be used. A complex-valued neural network is known as a neural network in which the input/output signals and weights that would belong in a real-valued neural network are extended to complex numbers. Therefore, the activation function to determine the output of the hidden layer node is also a complex function.

In the case of using a complex-valued neural network, different computation from the aforementioned computation to generate a spatial covariance matrix Rxx and a vector b0 or b is performed. Specifically, from the reception signal $I_m(t)$ of each antenna element, an orthogonal signal $Q_m(t)$ that is orthogonal to that real signal on the complex plane is derived. Then, $I_m(t)+jQ_m(t)$ is used as a respective input to the complex-valued neural network. The reception signal $I_m(t)$ corresponds to the earlier-mentioned $s_m$. The orthogonal signal $Q(t)$ is obtained by, for example, applying Hilbert transform to the reception signal of each antenna element. Note that a well-known Hilbert transformer may be used in applying Hilbert transform to the reception signal $I_m(t)$. Learning of the complex-valued neural network, and the identification process after the learning, can be performed by a signal processing circuit similar to the aforementioned processes of FIG. 8 and FIG. 9, except that the weights and activation function are different. Specific examples of the activation function to be used in a complex-valued neural network are omitted from illustration.

Hereinafter, with reference to the drawings as necessary, preferred embodiments of the present invention will be described in detail. Note however that unnecessarily detailed descriptions may be omitted. For example, detailed descriptions of what is well known in the art or redundant descriptions of what is substantially the same constitution may be omitted. This is to avoid lengthy description, and facilitate the understanding of those skilled in the art. The accompanying drawings and the following description, which are provided by the present inventors so that those skilled in the art can sufficiently understand the present disclosure, are not intended to limit the scope of claims.

Figure 10:
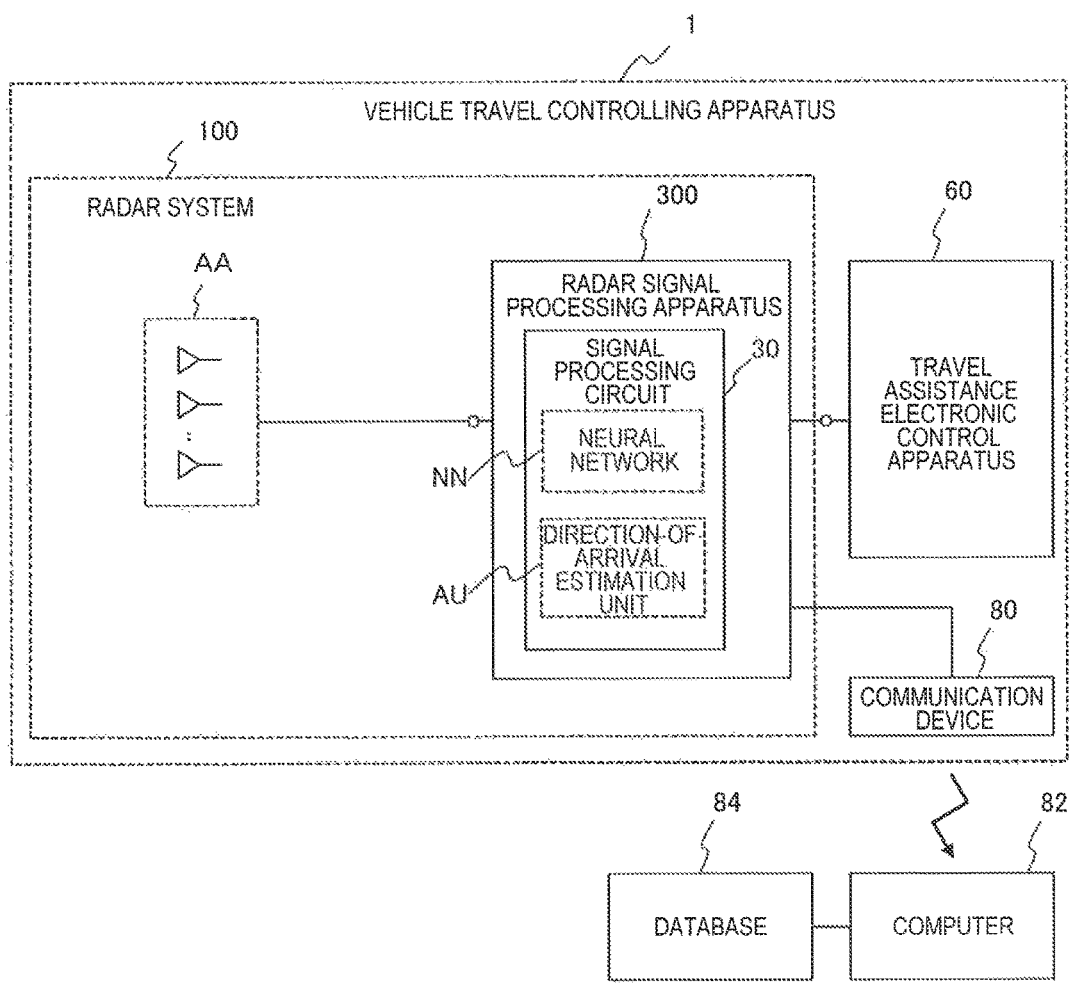
FIG. 10 is a block diagram showing an exemplary fundamental construction of a vehicle travel controlling apparatus 1 according to a preferred embodiment of the present invention.

First, FIG. 10 is referred to. FIG. 10 is a block diagram showing an exemplary fundamental construction of a vehicle travel controlling apparatus 1 according to a preferred embodiment of the present invention. The vehicle travel controlling apparatus 1 shown in FIG. 10 includes a radar system 100 which is mounted in a vehicle, and a travel assistance electronic control apparatus 60 which is connected to the radar system 100. The radar system 100 preferably includes: an array antenna AA having a plurality of antenna elements each of which outputs a reception signal in response to one or plural arriving waves; and a radar signal processing apparatus 300. In the radar system 100, the array antenna AA preferably is attached to the vehicle, while at least some of the functions of the radar signal processing apparatus 300 may preferably be implemented by a computer 82 and a database 84 which are preferably provided externally to the vehicle travel controlling apparatus 1 (e.g., outside of the driver's vehicle). In that case, via a communication device 80 of the vehicle and a commonly-available communications network, the portions of the radar signal processing apparatus 300 that are located within the vehicle may be perpetually or occasionally connected to the computer 82 and database 84 external to the vehicle so that bidirectional communications of signal or data are possible.

The database 84 may store learned data of a neural network and a program which defines various signal processing algorithms. The content of the data and program needed for the operation of the radar system 100 may be externally updated via the communication device 80. Thus, at least some of the functions of the radar system 100 can be realized externally to the driver's vehicle (which is inclusive of the interior of another vehicle), for example, by a cloud computing technique. Therefore, an "onboard" radar system in the meaning of the present disclosure does not require that all of its constituent elements be mounted within or on the (driver's) vehicle. However, for simplicity, the present application will describe an example implementation in which all constituent elements according to the present disclosure are mounted in a single vehicle (i.e., the driver's vehicle), unless otherwise specified. However, this example implementation is in no way limiting.

The radar signal processing apparatus 300 includes a signal processing circuit 30 in which a learned neural network NN has been established. The construction and operation of the neural network NN are as described earlier. The signal processing circuit 30 directly or indirectly receives reception signals from the array antenna AA, and inputs the reception signals, or a secondary signal(s) which has been generated from the reception signals, to the neural network NN. A part or a whole of the circuit (not shown) which generates a secondary signal(s) from the reception signals does not need to be provided inside of the signal processing circuit 30. A part or a whole of such a circuit (preprocessing circuit) may be provided between the array antenna AA and the radar signal processing apparatus 300.

The signal processing circuit 30 is configured or programmed to perform computation by using the reception signals or secondary signal(s), as well as learned data of the neural network NN, and output a signal indicating the number of arriving waves. As used herein, "a signal indicating the number of arriving waves" typically is a signal indicating the aforementioned "spatial distribution of vehicles". "A signal indicating the number of arriving waves" can be said to be a signal indicating the number of preceding vehicles (which may be one preceding vehicle or plural preceding vehicles that are traveling abreast of each other) ahead of the driver's vehicle.

The signal processing circuit 30 may be configured or programmed to execute various signal processing which is executable by known radar signal processing apparatuses. For example, the signal processing circuit 30 may be configured or programmed to execute "super-resolution algorithms" such as the MUSIC method, the ESPRIT method, or the SAGE method, or other algorithms for direction-of-arrival estimation of relatively low resolution.

In the example shown in FIG. 10, separately from the neural network NN, an arriving wave estimation circuit AU is provided in the signal processing circuit 30. The arriving wave estimation circuit AU is configured or programmed to estimate an angle representing the azimuth of each arriving wave by an arbitrary algorithm for direction-of-arrival estimation, and output a signal indicating the estimation result. The signal processing circuit 30 may be configured or programmed to estimate the distance to each target as a wave source of an arriving wave, the relative velocity of the target, and the azimuth of the target by using a known algorithm which is executed by the arriving wave estimation circuit AU, and output a signal indicating the estimation result. By providing such an arriving wave estimation circuit AU, it becomes possible to acquire position information of a preceding vehicle even in a situation where the neural network NN is unable to detect a spatial distribution pattern of vehicles, and utilize it for travel assistance.

In the present disclosure, the term "signal processing circuit" is not limited to a single circuit, but encompasses any implementation in which a combination of plural circuits is conceptually regarded as a single functional circuitry or processor, microprocessor, CPU, etc. The signal processing circuit may be realized by one or more System-on-Chips (SoCs). For example, a part or a whole of the signal processing circuit 30 may be an FPGA (Field-Programmable Gate Array), which is a programmable logic device (PLD). In that case, the signal processing circuit 30 may preferably include a plurality of computation elements (e.g., general-purpose logics and multipliers) and a plurality of memory elements (e.g., look-up tables or memory blocks). Alternatively, the signal processing circuit 30 may be defined by a set of a general-purpose processor(s) and a main memory device(s). The signal processing circuit 30 may be a circuit which includes a processor core(s) and a memory device(s). These may function as a signal processing circuit in the meaning of the present disclosure. In particular, with the advent of onboard computers which excel in parallel processing, the neural network NN is now easily realized by combining general-purpose hardware with special-purpose software which executes the algorithms, functions, flowchart processes, etc., according to various preferred embodiments of the present invention described and illustrated in detail in the present disclosure.

In the present specification, the signal processing circuit is indifferent as to whether it includes any storage devices or not; it suffices if the signal processing circuit is able to allow a given signal to be supplied as an input to the neural network, perform computation by applying learned data, and output a result. A signal processing circuit that is capable of such operation may be referred to as "a signal processing circuit in which a learned neural network has been established".

The travel assistance electronic control apparatus 60 is configured or programmed to provide travel assistance for the vehicle based on various signals which are output from the radar signal processing apparatus 300. The travel assistance electronic control apparatus 60 instructs various electronic control units or controllers to fulfill the following functions, for example: a function of issuing an alarm to prompt the driver to make a braking operation when the distance to a preceding vehicle (vehicular gap) has become shorter than a predefined value; a function of controlling the brakes; and a function of controlling the accelerator. For example, in the case of an operation mode which performs adaptive cruise control of the driver's vehicle, the travel assistance electronic control apparatus 60 sends predetermined signals to various electronic control units or controllers (not shown) and actuators, to maintain the distance of the driver's vehicle to a preceding vehicle at a predefined value, or maintain the traveling velocity of the driver's vehicle at a predefined value.

The signal processing circuit 30 may or may not operate depending on the substance of the control that is exercised by the travel assistance electronic control apparatus 60. For example, depending on the conditions for travel control, the signal processing circuit 30 may utilize only one of the neural network NN and the arriving wave estimation circuit AU, switch between them, or consecutively use them one after the other to operate. As a result, the signal processing circuit 30 outputs to the travel assistance electronic control apparatus 60 a spatial distribution pattern of a preceding vehicle or plural preceding vehicles that are abreast of each other, or information of an estimated angle representing the azimuth of each arriving wave.

The signal processing circuit 30 may have an operation mode which outputs only a signal indicating a spatial distribution pattern of a preceding vehicle or plural preceding vehicles that are abreast of each other. Under this operation mode, the neural network NN is utilized, while the arriving wave estimation circuit AU is not operated.

Alternatively, the signal processing circuit 30 may be configured or programmed to operate while switching between a first mode of utilizing the neural network NN, and a second mode of utilizing the arriving wave estimation circuit AU. There may be various conditions for travel control that stipulate switching between the first mode and the second mode. For example, the signal processing circuit 30 may select the first mode while ACC is activated, and the second mode while ACC is not activated. An example of the latter is during activation of an autonomous emergency braking (AEB) mode. While the first mode is selected, the output from the neural network NN indicates a spatial distribution pattern of preceding vehicles.

Once a spatial distribution of preceding vehicles is determined by the neural network NN, the number of preceding vehicles, i.e., the number of arriving waves, is able to be determined. So long as the number of arriving waves is known, eigenvalue decomposition for running a known algorithm for direction-of-arrival estimation becomes unnecessary. Stated otherwise, based on information of the number of arriving waves as detected by the neural network NN, it becomes possible to run an algorithm for direction-of-arrival estimation (e.g., the SAGE method) with a smaller computation amount than conventionally, and yet estimate the directions of preceding vehicles with a high accuracy.

In another example, the signal processing circuit 30 may switch between the first mode and the second mode in accordance with the vehicular gap and the velocity of the driver's vehicle. Alternatively, the signal processing circuit 30 may first acquire a signal indicating a spatial distribution pattern of preceding vehicles under the first mode, and then switch to the second mode to operate the arriving wave estimation circuit AU and estimate the directions of arrival of the arriving waves by utilizing the resultant spatial distribution pattern. In the case of the MUSIC method, a signal indicating the number of arriving waves is obtained by determining eigenvalues of the spatial covariance matrix, and identifying the number of those eigenvalues ("signal space eigenvalues") which have values equal to or greater than a predetermined value that is defined based on thermal noise. The amount of computation for eigenvalue determination is very large. Omitting that computation achieves significant reductions of calculation resources and computational processing.

In the example shown in FIG. 10, the radar system 100 does not need to include a transmission antenna to emit a transmission wave. The transmission antenna (not shown) may instead be fixed to the road or a building, or mounted in another vehicle, for example.

Figure 11:
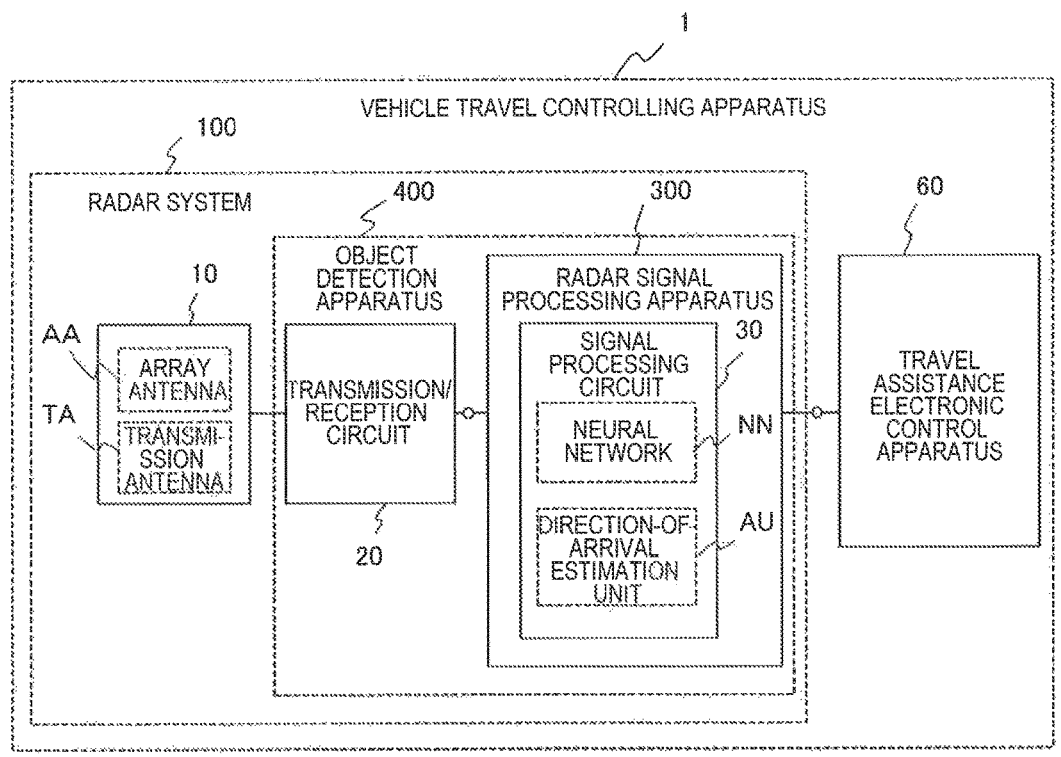
FIG. 11 is a block diagram showing another exemplary fundamental construction of the vehicle travel controlling apparatus according to a preferred embodiment of the present invention.

Next, FIG. 11 is referred to. FIG. 11 is a block diagram showing another exemplary fundamental construction of the vehicle travel controlling apparatus according to a preferred embodiment of the present invention. The radar system 100 in the vehicle travel controlling apparatus 1 of FIG. 11 includes: a radar antenna 10 which includes an array antenna AA and a transmission antenna TA that are mounted in the vehicle; and an object detection apparatus 400. The transmission antenna TA is an antenna that emits a transmission wave, which may be a millimeter wave, for example. The object detection apparatus 400 includes a transmission/reception circuit 20 which is connected to the radar antenna 10 and a radar signal processing apparatus 300 having the aforementioned construction.

The transmission/reception circuit 20 is configured or programmed to send a transmission signal for a transmission wave to the transmission antenna TA, and perform "preprocessing" for reception signals of reception waves received at the array antenna AA. A part or a whole of the preprocessing may be performed by the signal processing circuit 30 in the radar signal processing apparatus 300. A typical example of preprocessing to be performed by the transmission/reception circuit 20 may be generating a beat signal from a reception signal, and converting a reception signal of analog format into a reception signal of digital format.

FIG. 10 and FIG. 11 show implementations where the radar system 100 is mounted in the vehicle to define a part of the vehicle travel controlling apparatus 1. In the signal processing circuit 30 in the radar system 100, the neural network NN which has performed learning as described above is established; therefore, without estimating the azimuth of a preceding vehicle by using any conventional algorithm that may require an excessive computation amount, it is possible to grasp a spatial distribution of preceding vehicles. After a spatial distribution of preceding vehicles is determined by the neural network NN, travel assistance such as autocruising will become possible without having to determine accurate estimation values of azimuths of the preceding vehicles.

Note that the radar systems according to various preferred embodiments of the present invention may, without being limited to the implementation where it is mounted in the driver's vehicle, be used while being fixed on the road or a building.

Hereinafter, more specific preferred embodiments of the present invention will be described.

Figure 12:
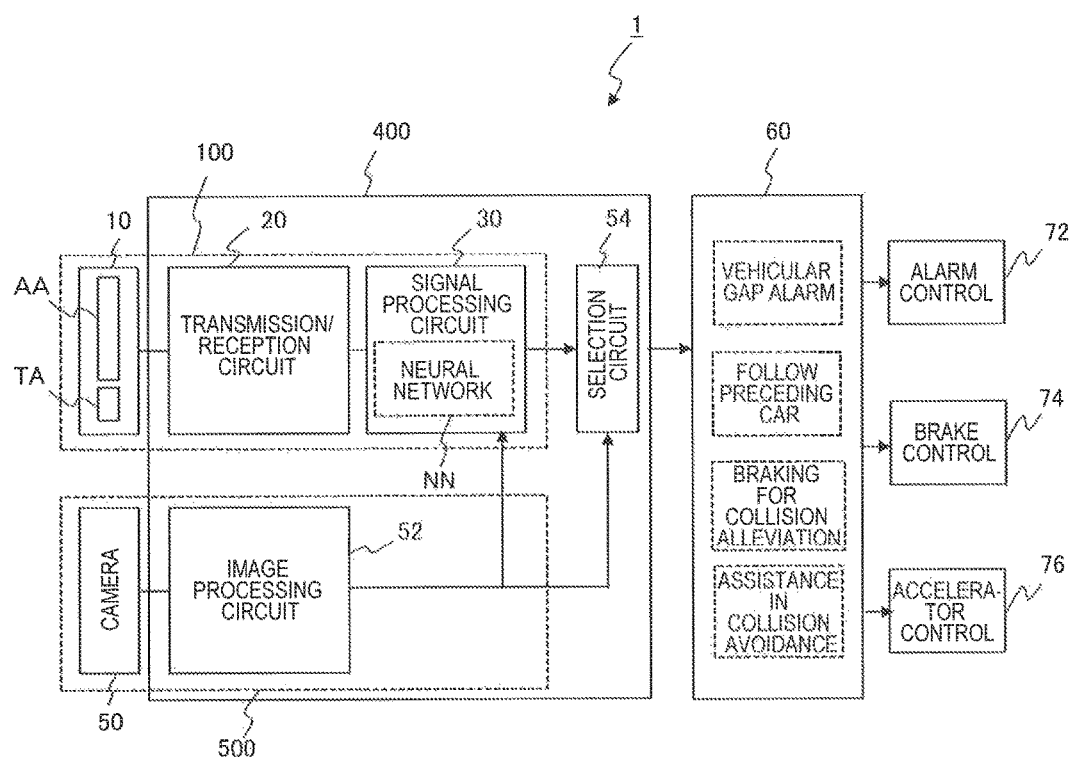
FIG. 12 is a block diagram showing a more specific preferred embodiment of the present invention in detail.

FIG. 12 is referred to. The vehicle travel controlling apparatus 1 of the present preferred embodiment shown in FIG. 12 includes a radar system 100 and an onboard camera system 500. In its fundamental construction, the radar system 100 preferably includes a radar antenna 10, a transmission/reception circuit 20 which is connected to the radar antenna 10, and a signal processing circuit 30 in which a learned neural network NN has been established. For simplicity, the direction-of-arrival estimation circuit AU, which appears in FIG. 10 and FIG. 11, is omitted from illustration.

The onboard camera system 500 includes an onboard camera 50 which is mounted in a vehicle, and an image processing circuit 52 which processes an image or video that is acquired by the onboard camera 50.

The vehicle travel controlling apparatus 1 of the present preferred embodiment includes an object detection apparatus 400 which is connected to the radar antenna 10 and the onboard camera 50, and a travel assistance electronic control apparatus 60 which is connected to the object detection apparatus 400. The object detection apparatus 400 includes a transmission/reception circuit 20 and an image processing circuit 52, in addition to the above-described signal processing circuit 30. The object detection apparatus 400 in the present preferred embodiment detects a target on the road or near the road, by using not only the information is obtained by the radar system 100 but also the information which is obtained by the image processing circuit 52. For example, while the driver's vehicle is traveling in one of two or more lanes of the same direction, the image processing circuit 52 can distinguish which lane the driver's vehicle is traveling in, and supply that result of distinction to the signal processing circuit 30. When a spatial distribution of preceding vehicles is to be recognized by using the neural network NN, the signal processing circuit 30 is able to provide more reliable information concerning a spatial distribution of preceding vehicles by referring to the information from the image processing circuit 30.

Note that the onboard camera system 500 is an example of a system or detector that identifies which lane the driver's vehicle is traveling in. The lane position of the driver's vehicle may be identified by any other system or detector. For example, by utilizing an ultra-wide band (UWB) technique, it is possible to identify which one of a plurality of lanes the driver's vehicle is traveling in. It is widely known that the ultra-wide band technique is applicable to position measurement and/or radar. By using the ultra-wide band technique, it becomes possible to identify distance from a guardrail on the road shoulder, or from the median strip. The width of each lane is predefined based on each country's law or the like. By using such information, it becomes possible to identify where the lane in which the driver's vehicle is currently traveling is. Note that the ultra-wide band technique is an example. A radio wave based on any other wireless technique may be used. Moreover, a laser radar may be used.

The radar antenna 10 may be a generic millimeter wave radar antenna for onboard use. The transmission antenna TA in the present preferred embodiment emits a millimeter wave as a transmission wave ahead of the vehicle. A portion of the transmission wave is reflected off a target which is typically a preceding vehicle, whereby a reflected wave occurs from the target being a wave source. A portion of the reflected wave reaches the array antenna (reception antenna) AA as an arriving wave. Each of the plurality of antenna elements of the array antenna AA outputs a reception signal in response to one or plural arriving waves. In the case where the number of targets functioning as wave sources of reflected waves is K (where K is an integer of one or more), the number of arriving waves is K, but this number K of arriving waves is not known beforehand. By performing the aforementioned signal processing utilizing a neural network, it becomes possible to estimate the number K of arriving waves with a smaller computation amount than conventionally possible.

The radar antenna 10 in the present preferred embodiment preferably is disposed on the front surface of the vehicle, so as to be able to detect targets that are ahead of the vehicle. The number and positions of radar antennas 10 to be disposed on the vehicle are not limited to any specific number or specific positions. The radar antenna 10 may be disposed on the rear surface of the vehicle so as to be able to detect targets that are behind the vehicle. Moreover, a plurality of radar antennas 10 may be disposed on the front surface and the rear surface of the vehicle. The radar antenna 10 may be disposed inside of the vehicle. Especially in the case where the respective antenna elements of the array antenna AA are horn antennas, the array antenna with such antenna elements may be situated inside of the vehicle, where there is ample space. In the case where the array antenna AA and the transmission antenna TA are mounted on the same vehicle, the array antenna AA and the transmission antenna TA may be distanced by about 100 millimeters or more, for example.

The signal processing circuit 30 receives and processes the reception signals from the array antenna AA. This process encompasses inputting the reception signals to the neural network NN, or alternatively, generating a secondary signal(s) from the reception signals and inputting the secondary signal(s) to the neural network NN. The neural network NN is configured or programmed to perform computation using the reception signals or secondary signal(s) and learned data, and output a signal indicating the number of arriving waves.

In the example of FIG. 12, a selection circuit 54 which receives the signal being output from the signal processing circuit 30 and the signal being output from the image processing circuit 52 is provided in the object detection apparatus 400. The selection circuit 54 allows one or both of the signal being output from the signal processing circuit 30 and the signal being output from the image processing circuit 52 to be fed to the travel assistance electronic control apparatus 60.

Figure 13:
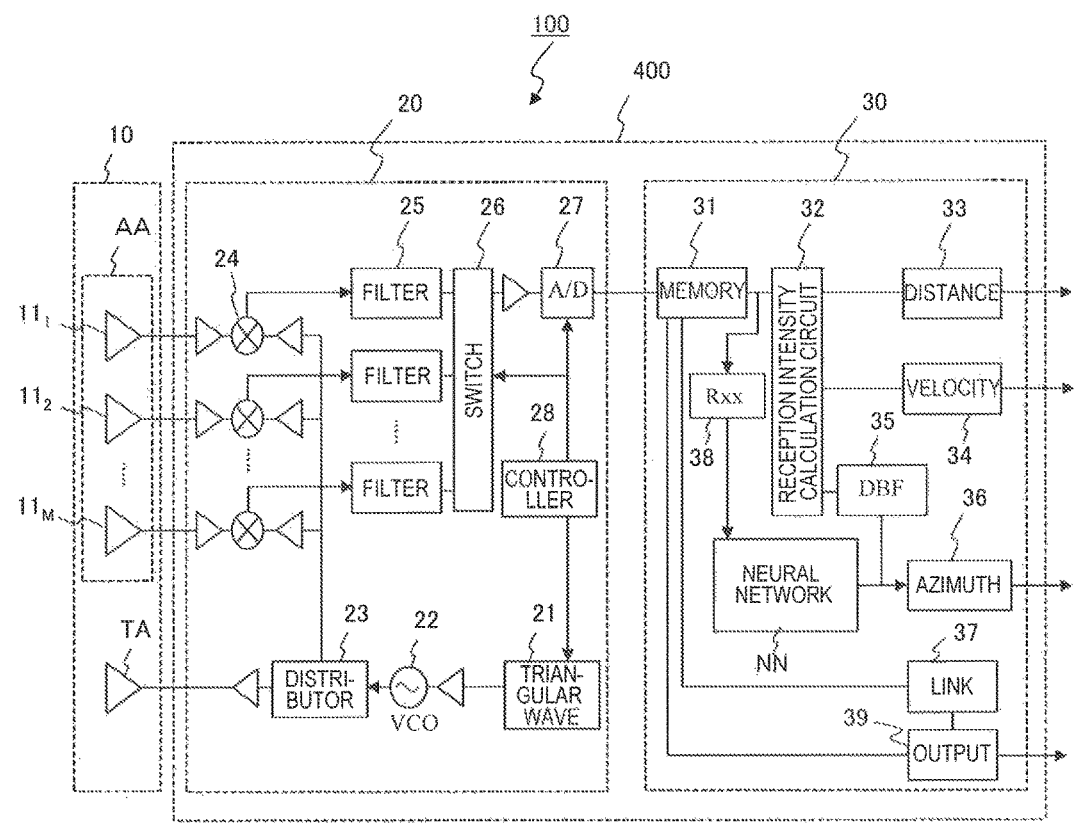
FIG. 13 is a block diagram showing a more detailed exemplary construction of a radar system 100 according to a preferred embodiment of the present invention.

FIG. 13 is a block diagram showing a more detailed exemplary construction of a radar system 100 according to the present preferred embodiment.

As shown in FIG. 13, the radar antenna 10 includes a transmission antenna TA which transmits a millimeter wave and an array antenna AA which receives arriving waves reflected from targets. The array antenna AA includes M antenna elements $11_1, 11_2, \ldots, 11_M$ (where M is an integer of 3 or more). In response to the arriving waves, the plurality of antenna elements $11_1, 11_2, \ldots, 11_M$ respectively output reception signals $S_1, S_2, \ldots, S_M$ (FIG. 2).

In the array antenna AA, the antenna elements $11_1$ to $11_M$ are arranged in a linear array or a two-dimensional array at fixed intervals, for example. Each arriving wave will impinge on the array antenna AA from a direction at an angle $\theta$ with respect to the normal of the plane in which the antenna elements $11_1$ to $11_M$ are arrayed. Thus, the direction of arrival of an arriving wave is defined by this angle $\theta$.

When an arriving wave from one target impinges on the array antenna AA, this approximates to a plane wave impinging on the antenna elements $11_1$ to $11_M$ from azimuths of the same angle $\theta$. When K arriving waves impinge on the array antenna AA from K targets with different azimuths, the individual arriving waves can be identified in terms of respectively different angles $\theta_1$ to $\theta_K$.

As shown in FIG. 13, the object detection apparatus 400 includes the transmission/reception circuit 20 and the signal processing circuit 30.

The transmission/reception circuit 20 includes a triangular wave generation circuit 21, a VCO (voltage controlled oscillator) 22, a distributor 23, mixers 24, filters 25, a switch 26, an A/D converter 27, and a controller 28. Although the radar system in the present preferred embodiment is configured or programmed to perform transmission and reception of millimeter waves by the FMCW method, the radar system of the present disclosure is not limited to this method. The transmission/reception circuit 20 is configured or programmed to generate a beat signal based on a reception signal from the array antenna AA and a transmission signal from the transmission antenna TA.

The signal processing circuit 30 is configured or programmed to include a distance detection circuit or detector 33, a velocity detection circuit or detector 34, and an azimuth detection circuit or detector 36. The signal processing circuit 30 is configured or programmed to process a signal from the A/D converter 27 in the transmission/reception circuit 20, and output signals respectively indicating the detected distance to the target, the relative velocity of the target, and the azimuth of the target.

First, the construction and operation of the transmission/reception circuit 20 will be described in detail.

Figure 14:
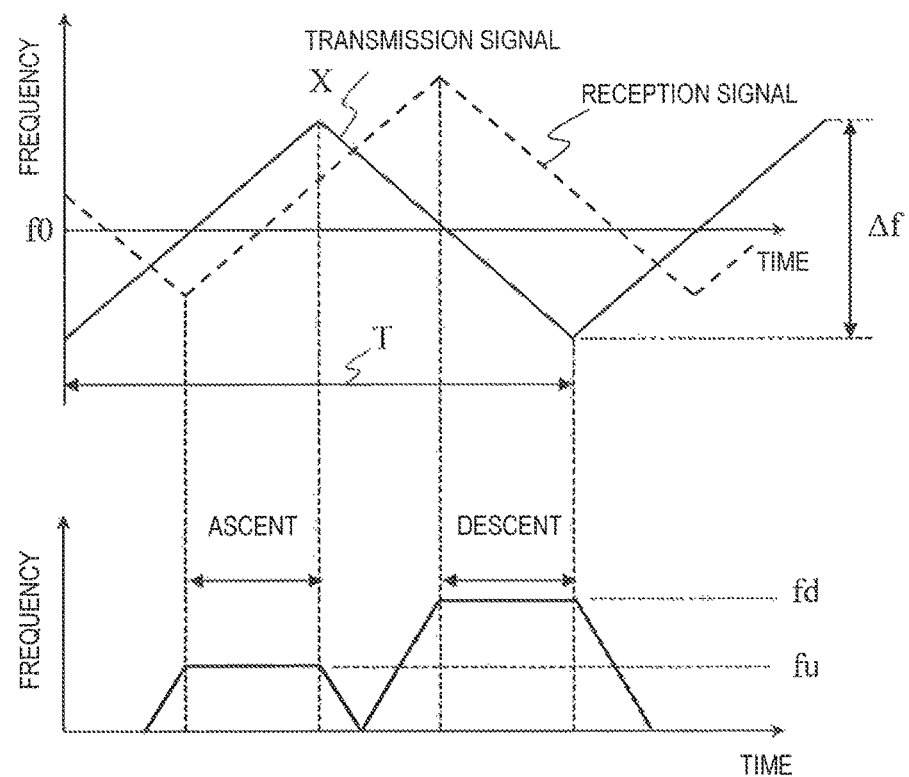
FIG. 14 is a diagram showing change in frequency of a transmission signal which is modulated based on a signal that is generated by a triangular wave generation circuit.

The triangular wave generation circuit 21 generates a triangular wave signal, and supplies it to the VCO 22. The VCO 22 outputs a transmission signal having a frequency as modulated based on the triangular wave signal. FIG. 14 is a diagram showing change in frequency of a transmission signal which is modulated based on the signal that is generated by the triangular wave generation circuit 21. This waveform has a modulation width $\Delta f$ and a center frequency of f0. The transmission signal having a thus modulated frequency is supplied to the distributor 23. The distributor 23 allows the transmission signal obtained from the VCO 22 to be distributed among the mixers 24 and the transmission antenna TA. Thus, the transmission antenna emits a millimeter wave having a frequency which is modulated in triangular waves, as shown in FIG. 14.

In addition to the transmission signal, FIG. 14 also shows an example of a reception signal from an arriving wave which is reflected from a single preceding vehicle. The reception signal is delayed from the transmission signal. This delay is in proportion to the distance between the driver's vehicle and the preceding vehicle. Moreover, the frequency of the reception signal increases or decreases in accordance with the relative velocity of the preceding vehicle, due to the Doppler effect.

When the reception signal and the transmission signal are mixed, a beat signal is generated based on their frequency difference. The frequency of this beat signal (beat frequency) differs between a period in which the transmission signal increases in frequency (ascent) and a period in which the transmission signal decreases in frequency (descent). Once a beat frequency for each period is determined, based on such beat frequencies, the distance to the target and the relative velocity of the target are calculated.

Figure 15:
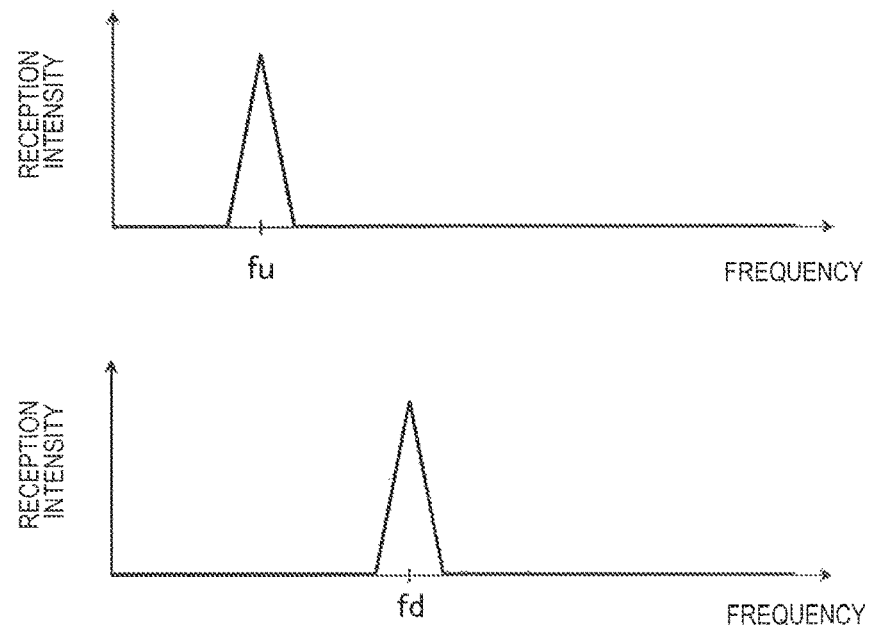
FIG. 15 is a diagram showing a beat frequency fu in an "ascent" period and a beat frequency fd in a "descent" period.

FIG. 15 shows a beat frequency fu in an "ascent" period and a beat frequency fd in a "descent" period. In the graph of FIG. 15, the horizontal axis represents frequency, and the vertical axis represents signal intensity. This graph is obtained by subjecting the beat signal to time-frequency conversion. Once the beat frequencies fu and fd are obtained, based on a known equation, the distance to the target and the relative velocity of the target are calculated. In the present preferred embodiment, with the construction and operation described below, beat frequencies corresponding to each antenna element of the array antenna AA are obtained, thus enabling estimation of the position information of a target.

In the example shown in FIG. 13, reception signals from channels $Ch_1$ to $Ch_M$ corresponding to the respective antenna elements $11_1$ to $11_M$ are each amplified by an amplifier, and input to the corresponding mixers 24. Each mixer 24 mixes the transmission signal into the amplified reception signal. Through this mixing, a beat signal is generated corresponding to the frequency difference between the reception signal and the transmission signal. The generated beat signal is fed to the corresponding filter 25. The filters 25 apply bandwidth control to the beat signals on the channels $Ch_1$ to $Ch_M$, and supply bandwidth-controlled beat signals to the switch 26.

The switch 26 performs switching in response to a sampling signal which is input from the controller 28. The controller 28 may be a microcomputer, an electronic control unit, etc., for example. Based on a computer program which is stored in a memory such as a ROM, the controller 28 controls the entire transmission/reception circuit 20. The controller 28 does not need to be provided inside the transmission/reception circuit 20, but may be provided inside the signal processing circuit 30. In other words, the transmission/reception circuit 20 may operate in accordance with a control signal from the signal processing circuit 30. Alternatively, some or all of the functions of the controller 28 may be realized by a central processing unit which controls the entire transmission/reception circuit 20 and signal processing circuit 30.

The beat signals on the channels $Ch_1$ to $Ch_M$ having passed through the respective filters 25 are consecutively supplied to the A/D converter 27 via the switch 26. In synchronization with the sampling signal, the A/D converter 27 converts the beat signals on the channels $Ch_1$ to $Ch_M$, which are input from the switch 26 in synchronization with the sampling signal, into digital signals.

Hereinafter, the construction and operation of the signal processing circuit 30 will be described in detail. In the present preferred embodiment, the distance to the target and the relative velocity of the target are estimated by the FMCW method. Without being limited to the FMCW method as described below, the radar systems according to various preferred embodiments of the present invention may also be implemented by using other methods, e.g., 2 frequency CW and spread spectrum methods.

In the example shown in FIG. 13, the signal processing circuit 30 preferably is configured or programmed to include a memory 31, a reception intensity calculation circuit or calculator 32, a distance detection circuit or detector 33, a velocity detection circuit or detector 34, a DBF (digital beam forming) processing circuit or processor 35, an azimuth detection circuit or detector 36, a target link processing circuit or processor 37, a matrix generation circuit or generator (Rxx) 38, and a learned neural network NN. As mentioned earlier, a part or a whole of the signal processing circuit 30 may be implemented by FPGA, or by a set of a general-purpose processor(s) and a main memory device (s). The memory 31, the reception intensity calculation circuit or calculator 32, the DBF processing circuit or processor 35, the distance detection circuit or detector 33, the velocity detection circuit or detector 34, the azimuth detection circuit or detector 36, the target link processing circuit or processor 37, and the neural network NN may be functional blocks of a single signal processing circuit, rather than being individual parts that are implemented in distinct pieces of hardware. In the case where the neural network NN is a complex-valued neural network, the matrix generation circuit or generator 38 does not need to be provided. Instead of the matrix generation circuit or generator 38, a circuit which generates an analytic signal may be provided.

Figure 16:
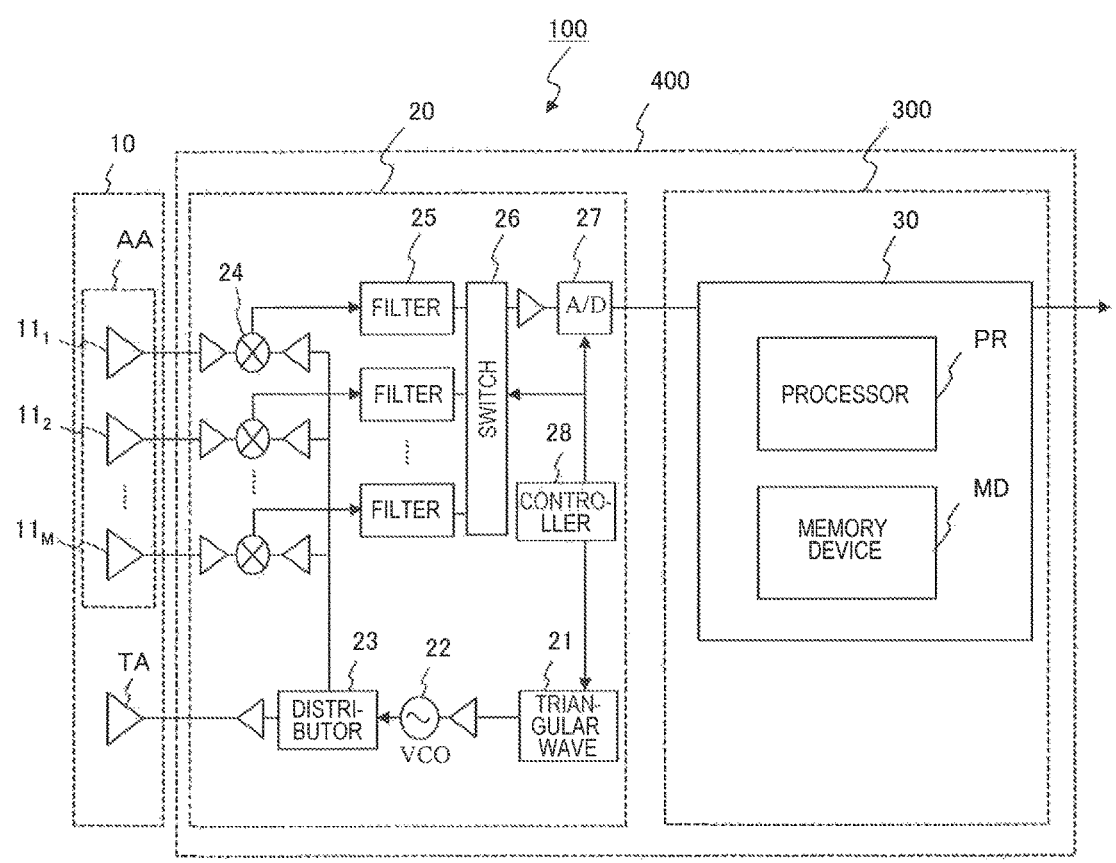
FIG. 16 is a block diagram showing an implementation in which the signal processing circuit 30 is implemented in hardware including a processor PR and a memory device MD.

FIG. 16 shows an exemplary implementation in which the signal processing circuit 30 is implemented in hardware including a processor PR and a memory device MD. In the signal processing circuit 30 with this construction, too, a computer program that is stored in the memory device MD may fulfill the functions of the reception intensity calculation circuit or calculator 32, the DBF processing circuit or processor 35, the distance detection circuit or detector 33, the velocity detection circuit or detector 34, the azimuth detection circuit or detector 36, the target link processing circuit or processor 37, the matrix generation circuit or generator 38, and the learned neural network NN.

The signal processing circuit 30 in the present preferred embodiment is configured or programmed to estimate the position information of a preceding vehicle by using each beat signal converted into a digital signal as a secondary signal of the reception signal, and output a signal indicating the estimation result. Hereinafter, the construction and operation of the signal processing circuit 30 in the present preferred embodiment will be described in detail.

For each of the channels $Ch_1$ to $Ch_M$, the memory 31 in the signal processing circuit 30 stores a digital signal which is output from the A/D converter 27. The memory 31 may include a generic storage medium such as a semiconductor memory or a hard disk and/or an optical disk, for example.

The reception intensity calculation circuit or calculator 32 applies Fourier transform to the respective beat signals for the channels $Ch_1$ to $Ch_M$ (shown in the lower graph of FIG. 14) that are stored in the memory 31. In the present specification, the amplitude of a piece of complex number data after the Fourier transform is referred to as "signal intensity". The reception intensity calculation circuit or calculator 32 converts the complex number data of a reception signal from one of the plurality of antenna elements, or a sum of the complex number data of all reception signals from the plurality of antenna elements, into a frequency spectrum. In the resultant spectrum, beat frequencies corresponding to respective peak values, which are indicative of presence and distance of targets (preceding vehicles), can be detected. Taking a sum of the complex number data of the reception signals from all antenna elements will allow the noise components to average out, whereby the S/N ratio is improved.

In the case where there is one target, i.e., one preceding vehicle, as shown in FIG. 15, the Fourier transform will produce a spectrum having one peak value in a period of increasing frequency (the "ascent" period) and one peak value in a period of decreasing frequency ("the descent" period). The beat frequency of the peak value in the "ascent" period is denoted "fu", whereas the beat frequency of the peak value in the "descent" period is denoted "fd".

From the signal intensities of beat frequencies, the reception intensity calculation circuit or calculator 32 detects any signal intensity that exceeds a predefined value (threshold value), thus determining the presence of a target. Upon detecting a signal intensity peak, the reception intensity calculation circuit or calculator 32 outputs the beat frequencies (fu, fd) of the peak values to the distance detection circuit or detector 33 and the velocity detection circuit or detector 34 as the frequencies of the object of interest. The reception intensity calculation circuit or calculator 32 outputs information indicating the frequency modulation width $\Delta f$ to the distance detection circuit or detector 33, and outputs information indicating the center frequency f0 to the velocity detection circuit or detector 34.

In the case where signal intensity peaks corresponding to plural targets are detected, the reception intensity calculation circuit or calculator 32 determines associations between the ascents peak values and the descent peak values based on predefined conditions. Peaks which are determined as belonging to signals from the same target are given the same number, and thus are fed to the distance detection circuit or detector 33 and the velocity detection circuit or detector 34.

When there are plural targets, after the Fourier transform, as many peaks as there are targets will appear in the ascent portions and the descent portions of the beat signal. In proportion to the distance between the radar and a target, the reception signal will become more delayed and the reception signal in FIG. 14 will shift more toward the right. Therefore, a beat signal will have a greater frequency as the distance between the target and the radar increases.

Based on the beat frequencies fu and fd which are input from the reception intensity calculation circuit or calculator 32, the distance detection circuit or detector 33 calculates a distance R through the equation below, and supplies it to the target link processing circuit or processor 37.

$$R=\{C\cdot T/(2\cdot\Delta f)\}\cdot\{(fu+fd)/2\}$$

Moreover, based on the beat frequencies fu and fd being input from the reception intensity calculation circuit or calculator 32, the velocity detection circuit or detector 34 calculates a relative velocity V through the equation below, and supplies it to the target link processing circuit or processor 37.

$$V=\{C/(2\cdot f0)\}\cdot\{(fu-fd)/2\}$$

In the equation which calculates the distance R and the relative velocity V, C is velocity of light, and T is the modulation period.

Note that the lower limit resolution of distance R is expressed as $C/(2\Delta f)$. Therefore, as $\Delta f$ increases, the resolution of distance R increases. In the case where the frequency f0 is approximately in the 76 gigahertz (GHz) band, when $\Delta f$ is set on the order of 600 megahertz (MHz), the resolution of distance R will be on the order of about 0.7 meters (m), for example. Therefore, if two preceding vehicles are traveling abreast of each other, it may be difficult with the FMCW method to identify whether there is one vehicle or two vehicles. In such a case, it might be possible to run an algorithm for direction-of-arrival estimation that has an extremely high angular resolution to separate between the azimuths of the two preceding vehicles and enable detection. However, as described earlier, running such an algorithm for direction-of-arrival estimation will require a huge amount of computational processing to be rapidly executed. Moreover, if a sudden change occurs in the situation of travel concerning preceding vehicles, the computation will not catch up with the change, so that two preceding vehicles that are traveling abreast of each other may be incorrectly estimated as one vehicle. However, according to the present preferred embodiment, it is possible through the use of the neural network NN to rapidly grasp a spatial distribution of preceding vehicles with a small computational processing amount, thus making it easy to avoid such mistakes.

By utilizing phase differences between signals from the antenna elements $11_1$, $11_2$, . . . , $11_M$, the DBF processing circuit or processor 35 allows the incoming complex data corresponding to the respective antenna elements, which has been Fourier transformed with respect to the time axis, to be Fourier transformed with respect to the direction in which the antenna elements are arrayed. Then, the DBF processing circuit or processor 35 calculates spatial complex number data indicating the spectrum intensity for each angular channel as determined by the angular resolution, and outputs it to the azimuth detection circuit or detector 36 for the respective beat frequencies.

The azimuth detection circuit or detector 36 is configured or programmed to estimate the azimuth of a preceding vehicle, this being done in addition to the process of utilizing the neural network NN to recognize a spatial distribution of preceding vehicles, or in a manner of utilizing such information concerning a spatial distribution of preceding vehicles. Among the values of spatial complex number data that has been calculated for the respective beat frequencies, the azimuth detection circuit or detector 35 chooses an angle θ that takes the largest value, and outputs it to the target link processing circuit or processor 37 as the azimuth at which an object of interest exists. Note that the method of estimating the angle θ indicating the direction of arrival of an arriving wave is not limited to this example. Various algorithms for direction-of-arrival estimation that have been mentioned earlier can be used. In accordance with various preferred embodiments of the present disclosure, in particular, a spatial distribution of preceding vehicles is able to be detected, i.e., the number of arriving waves becomes known. This makes it possible to reduce the amount of computational processing required for an algorithm for direction-of-arrival estimation and attain an azimuth estimation with high resolution.

The target link processing circuit or processor 37 calculates absolute values of the differences between the respective values of distance, relative velocity, and azimuth of the object of interest as calculated in the current cycle and the respective values of distance, relative velocity, and azimuth of the object of interest as calculated 1 cycle before, which are read from the memory 31. Then, if the absolute value of each difference is smaller than a value which is defined for the respective value, it is determined that the target that was detected 1 cycle before and the target detected in the current cycle are an identical target. In that case, the target link processing circuit or processor 37 increments the count of target link processes, which is read from the memory 31, by one.

If the absolute value of a difference is greater than predetermined, the target link processing circuit or processor 37 determines that a new object of interest has been detected. The target link processing circuit or processor 37 stores the respective values of distance, relative velocity, and azimuth of the object of interest as calculated in the current cycle and also the count of target link processes for that object of interest to the memory 31.

In the signal processing circuit 30, the distance to the object of interest and its relative velocity are able to be detected by using a spectrum which is obtained through a frequency analysis of beat signals, which are signals generated based on received reflected waves.

The matrix generation circuit or generator 38 generates a spatial covariance matrix by using the respective beat signals for the channels $Ch_1$ to $Ch_M$ (lower graph in FIG. 14) stored in the memory 31. In the spatial covariance matrix of Equation 4, each component is the value of a beat signal which is expressed in terms of real and imaginary parts. The matrix generation circuit or generator 38 performs computation according to Equation 5 to determine a vector $b_0$, and further determine a normalized vector b according to Equation 6. The matrix generation circuit or generator 38 inputs the resultant vector b to the neural network NN.

In connection with Equation 5, the vector b0 has been explained to be a column vector expressing the elements of an upper triangular matrix (excluding the diagonal components of the spatial covariance matrix Rxx) in terms of real and imaginary parts. However, the matrix generation circuit or generator 38 may generate a vector b0 by using only some components of the upper triangular matrix, rather than all of them. Alternatively, the matrix generation circuit or generator 38 may generate a vector b0 which includes the diagonal components in addition to a whole or apart of the upper triangular matrix. In the present specification, the spatial covariance matrix at least includes a portion of the upper triangular matrix.

In the example shown in FIG. 12, the image processing circuit 52 acquires information of an object from the video, and detects target position information from the object information. For example, the image processing circuit 52 is configured or programmed to estimate distance information of an object by detecting the depth value of an object within an acquired video, or detect size information and the like of an object from characteristic amounts in the video, thus detecting position information of the object.

The selection circuit 54 selectively feeds position information which is received from the signal processing circuit 30 or the image processing circuit 52 to the travel assistance electronic control apparatus 60. For example, the selection circuit 54 compares a first distance, i.e., the distance from the driver's vehicle to a detected object as contained in the object position information from the signal processing circuit 30, against a second distance, i.e., the distance from the driver's vehicle to the detected object as contained in the object position information from the image processing circuit 52, and determines which is closer to the driver's vehicle. For example, based on the result of determination, the selection circuit 54 may select the object position information which indicates a closer distance to the driver's vehicle, and output it to the travel assistance electronic control apparatus 60. If the result of determination indicates the first distance and the second distance to be of the same value, the selection circuit 54 may output either one, or both of them, to the travel assistance electronic control apparatus 60.

Based on predefined conditions, the travel assistance electronic control apparatus 60 having received the position information of a preceding object from the object detection apparatus 400 performs control to make the operation safer or easier for the driver who is driving the driver's vehicle, in accordance with the distance and size indicated by the object position information, the velocity of the driver's vehicle, road surface conditions such as rainfall, snowfall or clear weather, or other conditions. For example, if the object position information indicates that no object has been detected, the travel assistance electronic control apparatus 60 may send a control signal to the accelerator control circuit or controller 76 to increase speed up to a predefined velocity, thus controlling the accelerator control circuit or controller 76 to make an operation that is equivalent to stepping on the accelerator pedal.

In the case where the object position information indicates that an object has been detected, if it is determined to be at a predetermined distance from the driver's vehicle, the travel assistance electronic control apparatus 60 controls the brakes via the brake control circuit or controller 74 through a brake-by-wire construction or the like. In other words, it makes an operation of decreasing the velocity to maintain a constant vehicular gap. Upon receiving the object position information, the travel assistance electronic control apparatus 60 sends a control signal to the alarm control circuit or controller 72 so as to control lamp illumination or control audio through a loudspeaker which is provided within the vehicle, so that the driver is informed of the nearing of a preceding object. Upon receiving object position information including a spatial distribution of preceding vehicles, the travel assistance electronic control apparatus 60 may, if the traveling velocity is within a predefined range, automatically make the steering wheel easier to operate to the right or left, or control the hydraulic pressure on the steering wheel side so as to force a change in the direction of the wheels, thus providing assistance in collision avoidance with respect to the preceding object.

When a plurality of signal intensity peaks corresponding to plural objects of interest have been detected, the reception intensity calculation circuit or calculator 32 numbers the peak values respectively in the ascent portion and in the descent portion, beginning from those with smaller frequencies first, and output them to the target output processing circuit or processor 39. In the ascent and descent portions, peaks of any identical number correspond to the same object of interest. The identification numbers are to be regarded as the numbers assigned to the objects of interest. For simplicity of illustration, a leader line from the reception intensity calculation circuit or calculator 32 to the target output processing circuit or processor 39 is conveniently omitted from FIG. 13.

When the object of interest is a structure ahead, the target output processing circuit or processor 39 outputs the identification number of that object of interest as indicating a target. When receiving results of determination concerning plural objects of interest, such that all of them are structures ahead, the target output processing circuit or processor 39 outputs the identification number of an object of interest that is in the lane of the driver's vehicle as the object position information indicating where a target is. Moreover, when receiving results of determination concerning plural objects of interest, such that all of them are structures ahead and that two or more objects of interest are in the lane of the driver's vehicle, the target output processing circuit or processor 39 outputs the identification number of an object of interest that is associated with the largest count of target being read from the link processes memory 31 as the object position information indicating where a target is.

If information indicating that there is no prospective target is input from the reception intensity calculation circuit or calculator 32, the target output processing circuit or processor 39 outputs zero, indicating that there is no target, as the object position information. Then, on the basis of the object position information from the target output processing circuit or processor 39, through comparison against a predefined threshold value, the selection circuit 54 chooses either the object position information from the signal processing circuit 30 or the object position information from the image processing circuit 52 to be used.

The aforementioned object detection apparatus 400 can be implemented by a generic computer operating based on a program which causes it to function as the respective constituent elements above. Such a program may be distributed through telecommunication lines, or distributed in a form written to a semiconductor memory or a storage medium such as a CD-ROM.

The object detection apparatus 400 may be arranged so that, if a piece of object position information which was being continuously detected by the selection circuit 54 for a while in the previous detection cycle but which is not detected in the current detection cycle becomes associated with a piece of object position information from a camera-detected video indicating a preceding object, then continued tracking is chosen, and object position information from the signal processing circuit 30 is output with priority.

An exemplary specific construction and an exemplary operation for the selection circuit 54 to make a selection between the outputs from the signal processing circuit 30 and the image processing circuit 52 are disclosed in Japanese Laid-Open Patent Publication No. 2014-119348. The entire disclosure thereof is incorporated herein by reference.

Figure 17:
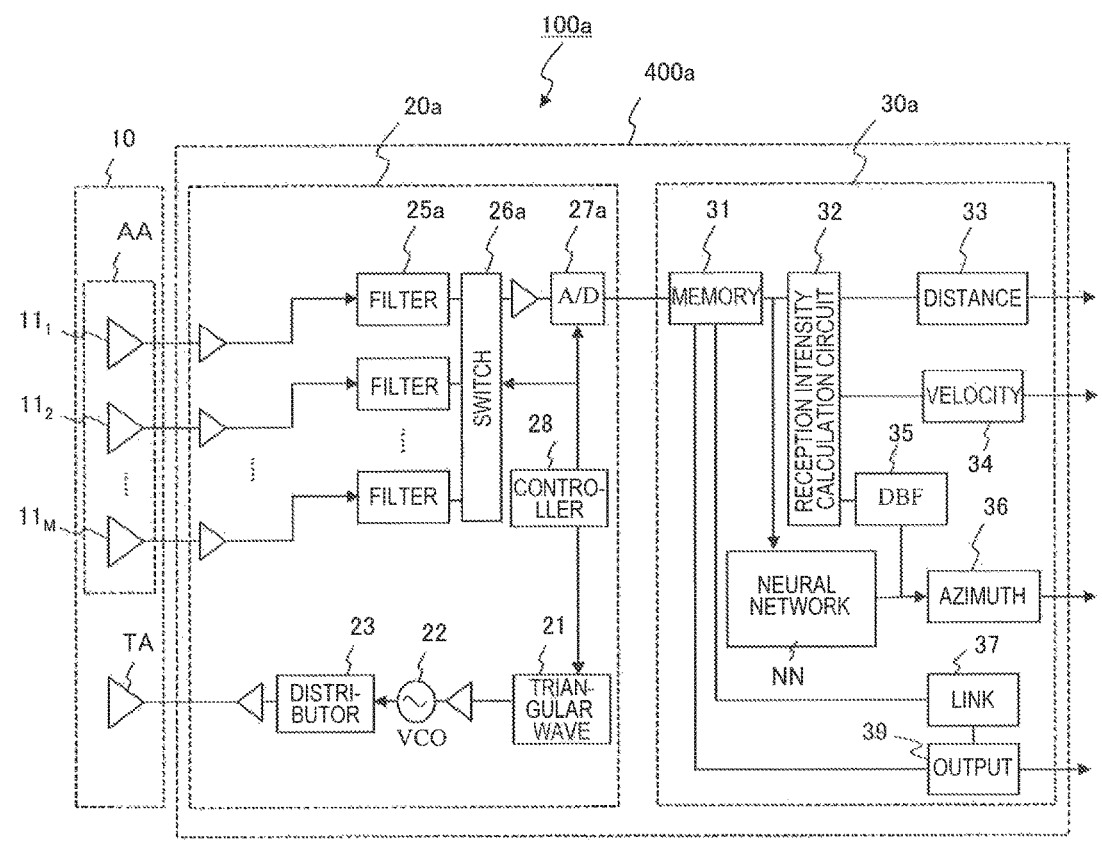
FIG. 17 is a block diagram showing an exemplary construction of a radar system 100a which does not utilize beat signals as inputs to the neural network.

FIG. 17 shows an exemplary construction of a radar system 100a which does not utilize beat signals as inputs to the neural network. Any hardware elements of the radar system 100a which are identical to those in the radar system 100 of FIG. 13 are denoted by like reference numerals, with their description being omitted unless needed.

Without generating any beat signals, the radar system 100a of the object detection apparatus 400a transmits reception signals from the respective antenna elements to a signal processing circuit 30a. The reception signals are led through filters 25a which remove unwanted signals therefrom, and are converted into digital signals through a switch 26a and an A/D converter 27a. The signal processing circuit 30a generates a column vector b0 (Equation 5) by using non-diagonal components of a spatial covariance matrix, and uses it as an input to the neural network.

Each reception signal has the same or substantially the same frequency as that of the transmission wave. For example, if the transmission frequency is approximately in the 76 gigahertz (GHz) band, the frequency of the reception signal is also approximately in the 76 gigahertz (GHz) band. The frequency of the reception signal may fluctuate to the extent of a Doppler shift.

The matrix generation circuit or generator 38 shown in FIG. 13 is also omitted from the exemplary construction shown in FIG. 17. This means that learning of the neural network NN is performed by straightforwardly using reception signals from the respective antenna elements as they are. Since it is not even necessary to generate a spatial covariance matrix, the amount of computational processing by the signal processing circuit 30a is greatly reduced.

Note that a spatial covariance matrix may be generated from the array reception signal, and learning of the neural network NN may be performed by using non-diagonal components thereof. In that case, the matrix generation circuit or generator 38 shown in FIG. 13 is preferably included. The matrix generation circuit or generator 38 may generate a spatial covariance matrix from the array reception signal, and input non-diagonal components thereof to the neural network NN.

However, apparent omission of the mixers 24 (FIG. 13) from the object detection apparatus 400a is a mere convenience of illustration. The distance detection circuit or detector 33 and the velocity detection circuit or detector 34 of the signal processing circuit 30a detect distance and velocity based on beat signals; therefore, construction for generating beat signals is still needed. In fact, constituent elements such as a triangular wave generation circuit 21 and a VCO 22 in FIG. 17 are provided on the premise of generating beat signals.

Figure 18:
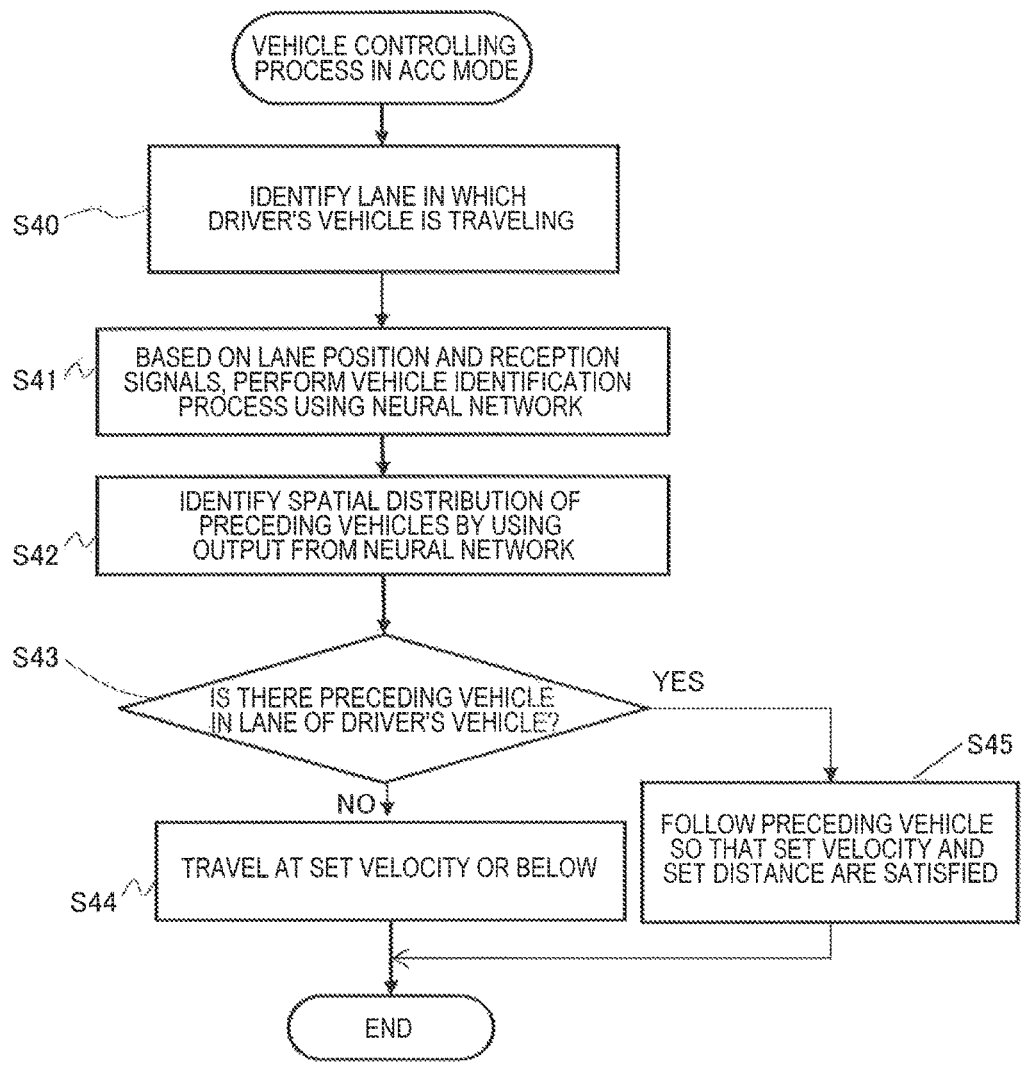
FIG. 18 is a flowchart showing a processing procedure by the vehicle travel controlling apparatus 1 (FIG. 12).

FIG. 18 is a flowchart showing a processing procedure by the vehicle travel controlling apparatus 1 (FIG. 12). As an instance, vehicle control in adaptive cruise control mode will be described.

At step S40, by using the onboard camera system 500, the vehicle travel controlling apparatus 1 identifies a lane in which the driver's vehicle is currently traveling. As described earlier, a radio wave may also be utilized in identifying a lane, instead of or in addition to using the onboard camera system 500.

At step S41, based on lane position information which is output from the image processing circuit 52 of the onboard camera system 500 and reception signals which are output from the transmission/reception circuit 20, the signal processing circuit 30 performs a vehicle identification process utilizing the neural network NN.

At step S42, the signal processing circuit 30 identifies a spatial distribution of preceding vehicles by using an output from the neural network NN.

At step S43, the signal processing circuit 30 determines whether any preceding vehicles exist in lane of the driver's vehicle. If any preceding vehicle exists, the process proceeds to step S44; if no preceding vehicle exists, the process proceeds to step S45.

At step S44, the travel assistance electronic control apparatus 60 instructs the brake control circuit or controller 74 to control the brakes, and/or instructs the accelerator control circuit or controller 76 to control the amount of injected fuel. Thus, the travel assistance electronic control apparatus 60 causes the driver's vehicle to travel at a set velocity or below.

At step S45, too, the travel assistance electronic control apparatus 60 instructs the brake control circuit or controller 74 to control the brakes, and/or instructs the accelerator control circuit or controller 76 to control the amount of injected fuel. Thus, the travel assistance electronic control apparatus 60 causes the driver's vehicle to follow the preceding vehicle, while satisfying a set velocity and a set distance.

Thus, specific preferred embodiments according to the present disclosure have been described above.

The above description illustrates examples where the number of preceding vehicles that are traveling abreast of each other at an identical distance from the driver's vehicle and the lanes in which the preceding vehicles are traveling are directly identified, and that information is utilized in a vehicle controlling method under adaptive cruise control mode.

Hereinafter, another example of utilizing a result of directly identifying the number of preceding vehicles that are traveling abreast of each other at an identical distance from the driver's vehicle and the lanes in which the preceding vehicles are traveling will be described.

A super-resolution direction-of-arrival estimation, where an angle indicating a direction of arrival is estimated with a high resolution, preferably uses the algorithm of the MUSIC method or the ESPRIT method, as described earlier. In the MUSIC method and the ESPRIT method, a process of estimating the number of arriving waves through eigenvalue decomposition needs to be performed for a spatial covariance matrix of reception signals from the array antenna. For example, in the MUSIC method, among the eigenvalues of a spatial covariance matrix, those eigenvalues having values which are greater than the variance of thermal noise power need to be counted. If this count of eigenvalues is incorrect, the estimation of a direction of arrival will turn out wrong.

These algorithms will provide a low accuracy of estimation when the number of snapshots is small and when coherent reflected waves have arrived.

Similarly to the MUSIC method and the ESPRIT method, the SAGE method based on maximum likelihood estimation is attracting attention as a high resolution algorithm for direction-of-arrival estimation. The SAGE method is known as an algorithm from which a high estimation accuracy is expected even in an environment where accuracy would be deteriorated under the MUSIC method and the ESPRIT method.

However, the SAGE method requires prior knowledge (information) of the number of arriving waves. Example methods for estimating the number of arriving waves are AIC (Akaike Information Criteria) and MDL (Minimum Description Length). Under these methods, data is collected a plurality of times, and a variance thereof is evaluated to estimate the number of arriving waves.

As this estimated number of arriving waves, an output from the neural networks according to various preferred embodiments of the present invention is able to be utilized. The reason is that an identified number of preceding vehicles is able to be utilized as the number of wave sources, i.e., the number of arriving waves.

FIG. 19 is a flowchart showing the procedure of a direction-of-arrival estimation process utilizing the SAGE method. This process can be performed by the signal processing circuit 30, for example.

At step S50, the vehicle travel controlling apparatus 1 identifies a lane in which the driver's vehicle is currently traveling. Then at step S51, the signal processing circuit 30 performs a vehicle identification process utilizing the neural network NN.

Steps S50 and S51 correspond to the processes of steps S40 and S41 in FIG. 18, and their description will not be repeated here.

At step S52, the signal processing circuit 30 identifies the number N of arriving waves from an output of the neural network. When either $T=[x\ y]^T$ or $T=[x\ y\ z]^T$ is obtained as the output result, the signal processing circuit 30 counts the number of "1"s among the x, y and z values, and identifies this number as the number N of arriving waves.

Steps S53 and the subsequent steps correspond to the algorithm of the SAGE method. The SAGE method is an algorithm whose rate of convergence is enhanced from that of the well-known EM (Expectation-Maximization) algorithm.

At step S53, by using the information of the identified number N of arriving waves, the signal processing circuit 30 divides the set H of parameters to be estimated under the EM algorithm into N subsets. The information of the number N of arriving waves is utilized in this division into subsets from the SAGE method.

At step S54, where the $n^{th}$ ($1 \le n \le N$) subset is denoted Hn, $H_1^{[i]}$ is updated by the EM algorithm, for a given fixed estimation value $Hn^{[i]}$ ($n \ne 1$) in the $i^{th}$ instance.

The EM algorithm is a sequential algorithm consisting of E steps and M steps. The E steps and the M steps are expressed by the following equations.

$$E\ \text{step}: Q(H, H^{[i]}) = E[f(Y, H) | Y, H^{[i]}]$$

$$M\ \text{step}: H^{[i+1]} = \arg\ \max Q(H, H^{[i]})$$

In the above steps, f(Y,H) denotes a log likelihood function; $Q(H, H^{[i]})$ denotes a conditional log likelihood function; $H^{[i]}$ denotes an estimation value of H in the $i^{th}$ instance; and E[|] denotes conditional averaging.

At step S55, the signal processing circuit 30 determines whether the value of n is N or not. If n=N is not true, the process proceeds to step S56; if n=N, the process proceeds to step S57.

At step S56, the signal processing circuit 30 increments the value of i to (i+1), and again executes the process of step S54.

By repeating the aforementioned process, $H^{[i]}$ asymptotically converges to an estimation value of maximum likelihood estimation.

At step S57, the signal processing circuit 30 outputs the computation result.

As will be understood from the above process as an example, a result of the vehicle identification process according to various preferred embodiments of the present invention utilizing a neural network is able to be used as an estimated number of arriving waves, such that the entire process of determining an angle indicating the direction of arrival of an arriving wave is able to be performed quickly and accurately.

The above description of various preferred embodiments of the present invention illustrates that the radar system is provided at the front of a vehicle, in order to obtain information indicating a spatial distribution of preceding vehicles. However, the radar system may be provided at the rear of a vehicle. In that case, the radar system will output information indicating a spatial distribution of following vehicles, i.e., those traveling behind the driver's vehicle. As used herein, a "following vehicle" is traveling in the same lane as the lane in which the driver's vehicle is traveling, or in an adjoining lane containing traffic of the same direction. It is important to know a spatial distribution of following vehicles when changing lanes.

Although the present specification chiefly illustrates situations where a preceding (or following) vehicle and the driver's vehicle are both "traveling", this does not literally require that both of the preceding (or following) vehicle and the driver's vehicle are in motion at the moment; for example, the preceding vehicle may happen to be stationary while the driver's vehicle is in motion, or the driver's vehicle may happen to be stationary while the following vehicle is in motion.

Preferred embodiments of the present invention are applicable to a radar system for onboard use which requires the process of recognizing a spatial distribution of preceding vehicles and/or following vehicles, for example. Furthermore, preferred embodiments of the present invention are applicable to a preprocessing for the SAGE method or other maximum likelihood estimation techniques, where a recognized spatial distribution of preceding vehicles and/or following vehicles is utilized as information of the number of arriving waves.

While the present invention has been described with respect to exemplary preferred embodiments thereof, it will be apparent to those skilled in the art that the disclosed invention may be modified in numerous ways and may assume many preferred embodiments other than those specifically described above. Accordingly, it is intended by the appended claims to cover all modifications of the invention that fall within the true spirit and scope of the present invention.

This application is based on Japanese Patent Application No. 2014-205609 filed on Oct. 6, 2014, the entire contents of which are hereby incorporated by reference.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A radar system comprising:
an array antenna including a plurality of antenna elements each of which outputs a reception signal in response to at least one arriving wave; and
a signal processing circuit in which a learned neural network has been established; wherein
the signal processing circuit:
receives the reception signals;
inputs the reception signals or a secondary signal generated from the reception signals, to the neural network;
performs computation by using the reception signals or the secondary signal, and data of the learned neural network; and
output a signal indicating a number of the at least one arriving wave from the neural network.

2. The radar system of claim 1, wherein
the radar system is mounted in a driver's vehicle; and
the signal processing circuit outputs the signal indicating the number of the at least one arriving wave as a signal indicating a number of preceding vehicles ahead of the driver's vehicle, where the preceding vehicles are one preceding vehicle or a plurality of the preceding vehicles that are abreast of each other.

3. The radar system of claim 2, wherein as a signal indicating a spatial distribution pattern of the one preceding vehicle or the plurality of preceding vehicles that are abreast of each other, the signal processing circuit outputs a signal indicating whether or not at least one of the preceding vehicles exists in a driver's lane in which the driver's vehicle is travelling and in a lane adjacent to the driver's lane.

4. The radar system of claim 3, wherein the signal processing circuit outputs a signal indicating a spatial distribution pattern of the one preceding vehicle or the plurality of preceding vehicles that are abreast of each other in terms of numerical values.

5. The radar system of claim 2, wherein the signal processing circuit:
generates a signal including non-diagonal components of a spatial covariance matrix from the reception signals;
inputs the signal containing non-diagonal components of the spatial covariance matrix to the learned neural network as the secondary signal; and
estimates a direction or directions of arrival of the at least one arriving wave based on the reception signals.

6. The radar system of claim 3, wherein the signal processing circuit:
generates a signal including non-diagonal components of a spatial covariance matrix from the reception signals;
inputs the signal containing non-diagonal components of the spatial covariance matrix to the learned neural network as the secondary signal; and
estimates a direction or directions of arrival of the at least one arriving wave based on the reception signals.

7. The radar system of claim 4, wherein the signal processing circuit:
generates a signal including non-diagonal components of a spatial covariance matrix from the reception signals;
inputs the signal containing non-diagonal components of the spatial covariance matrix to the learned neural network as the secondary signal; and
estimates a direction or directions of arrival of the at least one arriving wave based on the reception signals.

8. The radar system of claim 5, wherein the signal processing circuit selectively operates in one of:
a first mode of estimating a direction or directions of arrival of the at least one arriving wave by using the signal indicating the number of the at least one arriving wave output from the learned neural network; and
a second mode of estimating a direction or directions of arrival of the at least one arriving wave without using the signal indicating the number of the at least one arriving wave;
wherein the second mode estimates a direction or directions of arrival of the at least one arriving wave by performing an algorithm for direction-of-arrival estimation.

9. The radar system of claim 6, wherein the signal processing circuit selectively operates in one of:
a first mode of estimating a direction or directions of arrival of the at least one arriving wave by using the signal indicating the number of the at least one arriving wave output from the learned neural network; and
a second mode of estimating a direction or directions of arrival of the at least one arriving wave without using the signal indicating the number of the at least one arriving wave;
wherein the second mode estimates a direction or directions of arrival of the at least one arriving wave by performing an algorithm for direction-of-arrival estimation.

10. The radar system of claim 7, wherein the signal processing circuit selectively operates in one of:
a first mode of estimating a direction or directions of arrival of the at least one arriving wave by using the signal indicating the number of the at least one arriving wave output from the learned neural network; and
a second mode of estimating a direction or directions of arrival of the at least one arriving wave without using the signal indicating the number of the at least one arriving wave;
wherein the second mode estimates a direction or directions of arrival of the at least one arriving wave by performing an algorithm for direction-of-arrival estimation.

11. The radar system of claim 8, wherein the signal processing circuit selects the first mode when an adaptive cruise control is activated, and selects the second mode when the adaptive cruise control is not activated.

12. The radar system of claim 11, wherein when the adaptive cruise control is not activated is when an autonomous emergency braking mode is activated.

13. The radar system of claim 11, wherein the signal processing circuit switches between the first mode and the second mode in accordance with a vehicular gap and a velocity of the driver's vehicle.

14. The radar system of claim 12, wherein the signal processing circuit switches between the first mode and the second mode in accordance with a vehicular gap and a velocity of the driver's vehicle.

15. The radar system of claim 3, wherein the signal processing circuit operates in an output mode of outputting a signal indicating a spatial distribution pattern of the one preceding vehicle or the plurality of preceding vehicles that are abreast of each other without estimating a direction or directions of arrival of the at least one arriving wave.

16. The radar system of claim 4, wherein the signal processing circuit operates in an output mode of outputting a signal indicating a spatial distribution pattern of the one preceding vehicle or the plurality of preceding vehicles that are abreast of each other without estimating a direction or directions of arrival of the at least one arriving wave.

17. The radar system of claim 15, wherein
the signal processing circuit further operates in an estimation mode of estimating a direction or directions of arrival of the at least one arriving wave without using the signal indicating the number of the least one arriving wave; and
the signal processing circuit acquires a spatial distribution pattern of the one preceding vehicle or the plurality of preceding vehicles in the output mode, and thereafter performs processing in the estimation mode by utilizing the spatial distribution pattern of the one preceding vehicle or the plurality of preceding vehicles.

18. The radar system of claim 16, wherein
the signal processing circuit further operates in an estimation mode of estimating a direction or directions of arrival of the at least one arriving wave without using the signal indicating the number of the least one arriving wave; and
the signal processing circuit acquires a spatial distribution pattern of the one preceding vehicle or the plurality of preceding vehicles in the output mode, and thereafter performs processing in the estimation mode by utilizing the spatial distribution pattern of the one preceding vehicle or the plurality of preceding vehicles.

19. The radar system of claim 2, wherein
the signal processing circuit uses a camera or radio wave to identify a lane in which the driver's vehicle is traveling;
the learned neural network has been established in a lane-by-lane manner for predefined lanes for the driver's vehicle to travel in; and
the signal processing circuit selects the learned neural network in accordance with the lane in which the driver's vehicle is traveling, and outputs a signal indicating a spatial distribution pattern of the one preceding vehicle or the plurality of preceding vehicles.

20. The radar system of claim 1, wherein the signal processing circuit detects at least one target based on the reception signals, and determines a distance to the at least one target and a relative velocity of the at least one target relative to the array antenna.

21. The radar system of claim 7, wherein the signal processing circuit detects at least one target based on the reception signals, and determines a distance to the at least one target and a relative velocity of the at least one target relative to the array antenna.

22. The radar system of claim 11, wherein the signal processing circuit detects at least one target based on the reception signals, and determines a distance to the at least one target and a relative velocity of the at least one target relative to the array antenna.

23. The radar system of claim 3, wherein the learned neural network completes learning in a situation where other vehicles respectively exist in two adjoining lanes of a same direction as a direction of travel of the driver's vehicle and in a situation where none of the other vehicles exist, by using a spatial covariance matrix which is respectively generated in each situation using the reception signals and by using a training signal indicating a spatial distribution of vehicles in the lanes in each situation.

24. The radar system of claim 6, wherein the learned neural network completes learning in a situation where other vehicles respectively exist in two adjoining lanes of a same direction as a direction of travel of the driver's vehicle and in a situation where none of the other vehicles exist, by using a spatial covariance matrix which is respectively generated in each situation using the reception signals and by using a training signal indicating a spatial distribution of vehicles in the lanes in each situation.

25. The radar system of claim 7, wherein the learned neural network completes learning in a situation where other vehicles respectively exist in two adjoining lanes of a same direction as a direction of travel of the driver's vehicle and in a situation where none of the other vehicles exist, by using a spatial covariance matrix which is respectively generated in each situation using the reception signals and by using a training signal indicating a spatial distribution of vehicles in the lanes in each situation.

26. The radar system of claim 16, wherein the learned neural network completes learning in a situation where other vehicles respectively exist in two adjoining lanes of a same direction as a direction of travel of the driver's vehicle and in a situation where none of the other vehicles exist, by using a spatial covariance matrix which is respectively generated in each situation using the reception signals and by using a training signal indicating a spatial distribution of vehicles in the lanes in each situation.

27. The radar system of claim 2, wherein the signal processing circuit is a programmable logic device; and
wherein the signal processing circuit includes:
a plurality of computation elements to perform the computation; and
a plurality of memory elements storing the data of the learned neural network.

28. The radar system of claim 3, wherein the signal processing circuit includes:
only one signal processing circuit to perform the computation; and
a memory device storing the data of the learned neural network.

29. The radar system of claim 1, wherein the data of the learned neural network includes values of weights to be applied to inputs to nodes of the learned neural network.

30. The radar system of claim 2, wherein the data of the learned neural network includes values of weights to be applied to inputs to nodes of the learned neural network.

31. The radar system of claim 3, wherein the data of the learned neural network includes values of weights to be applied to inputs to nodes of the learned neural network.

32. The radar system of claim 4, wherein the data of the learned neural network includes values of weights to be applied to inputs to nodes of the learned neural network.

33. A radar signal processing apparatus to be mounted in a driver's vehicle, the radar signal processing apparatus comprising:
- a first terminal to acquire, from an array antenna including a plurality of antenna elements each of which outputs a reception signal in response to at least one arriving wave, the reception signals;
- a signal processing circuit in which a learned neural network has been established; and
- a second terminal to transmit a signal which is output from the signal processing circuit; wherein
- the signal processing circuit:
  - receives the reception signals via the first terminal;
  - inputs the reception signals or a secondary signal generated from the reception signals to the learned neural network;
  - performs computation by using the reception signals or secondary signal and data of the learned neural network; and
  - outputs a signal indicating a number of the at least one arriving wave from the learned neural network.

34. The radar signal processing apparatus of claim 33, wherein the signal processing circuit further outputs, as computed by using the reception signals, a signal indicating a distance between a driver's vehicle and at least one preceding vehicle in a driver's lane and in a lane adjacent to the driver's lane, and a signal indicating a relative velocity of the at least one preceding vehicle.

35. A vehicle travel controlling apparatus to be mounted in a driver's vehicle, the vehicle travel controlling apparatus comprising:
- an array antenna including a plurality of antenna elements each of which outputs a reception signal in response to at least one arriving wave;
- the radar signal processing apparatus of claim 34; and
- an electronic control apparatus to perform adaptive cruise control of the driver's vehicle and control a velocity of the driver's vehicle by using signals being output from the radar signal processing apparatus and respectively indicating a distance, a relative velocity, and a number of the at least one arriving wave.

36. A vehicle travel controlling method comprising:
- acquiring reception signals by using an array antenna including a plurality of antenna elements each of which outputs a reception signal in response to at least one arriving wave;
- inputting the reception signals or a secondary signal generated from the reception signals to a signal processing circuit in which a learned neural network has been established;
- performing computation in the signal processing circuit by using the reception signals or secondary signal and data of the learned neural network;
- outputting a signal indicating a number of the at least one arriving wave from the learned neural network;
- by using the reception signals, outputting signals respectively indicating distances between a driver's vehicle and at least one preceding vehicle in a driver's lane and in a lane adjacent to the driver's lane as corresponding to the at least one arriving wave and a relative velocity of the at least one preceding vehicle; and
- performing adaptive cruise control of the driver's vehicle by using the signals respectively indicating a distance, a relative velocity, and a number of the least one arriving wave to control a velocity of the driver's vehicle.

37. A non-transitory computer-readable medium having stored thereon a computer program to be executed by a signal processing circuit mounted in a vehicle, the vehicle including an array antenna including a plurality of antenna elements each of which outputs a reception signal in response to at least one arriving wave, the computer program causing the signal processing circuit to:
- receive the reception signals;
- input the reception signals or a secondary signal generated from the reception signals to a learned neural network;
- perform computation by using the reception signals or secondary signal and data of the learned neural network; and
- output a signal indicating a number of the at least one arriving wave from the learned neural network.

38. A radar system to be mounted in a driver's vehicle, the radar system comprising:
- an array antenna including a plurality of antenna elements each of which outputs a reception signal in response to at least one arriving wave; and
- a signal processing circuit in which a learned neural network has been established; wherein
- the neural network has completed learning in a situation where other vehicles respectively exist in two adjacent lanes of a same direction as a direction of travel of the driver's vehicle and in a situation where none of the other vehicles exist, by using non-diagonal components of a spatial covariance matrix which is respectively generated in each situation using the reception signals from the array antenna and by using a training signal indicating a spatial distribution of vehicles in the lanes in each situation; and
- the signal processing circuit:
  - receives the reception signals;
  - inputs the reception signals or a secondary signal generated from the reception signals to the learned neural network; and
  - as an output from the learned neural network, outputs a signal indicating whether any vehicle exists in each of the two adjacent lanes or not.

* * * * *

UNITED STATES PATENT AND TRADEMARK OFFICE
CERTIFICATE OF CORRECTION

PATENT NO. : 10,067,227 B2  
APPLICATION NO. : 14/870283  
DATED : September 4, 2018  
INVENTOR(S) : Hiroyuki Kamo et al.

Page 1 of 1

It is certified that error appears in the above-identified patent and that said Letters Patent is hereby corrected as shown below:

On the Title Page

Item (73), Assignees, change "NATIONAL UNIVERSITY CORPORATION SHIZUOKA UNIVERSIT, Shizuoka (JP)" to --NATIONAL UNIVERSITY CORPORATION SHIZUOKA UNIVERSITY, Shizuoka (JP)--.

Signed and Sealed this  
Twenty-seventh Day of August, 2019

Andrei Iancu  
*Director of the United States Patent and Trademark Office*